US012728662B2

United States Patent
(12) United States Patent
Brogger et al.

(10) Patent No.: US 12,728,662 B2
(45) Date of Patent: Sep. 8, 2026

(54) STANDARDIZATION OF TAGGANT SIGNATURES USING TRANSFER IMAGES

(71) Applicant: Microtrace, LLC, Minneapolis, MN (US)

(72) Inventors: Brian John Brogger, Blaine, MN (US); Joseph Thomas Ippoliti, Woodbury, MN (US); Blake Maxwell Roeglin, Minneapolis, MN (US); Brian Thomas Bustrom, Mounds View, MN (US)

(73) Assignee: Microtrace, LLC, Minneapolis, MN (US)

(*) Notice: Subject to any disclaimer, the term of this patent is extended or adjusted under 35 U.S.C. 154(b) by 0 days.

(21) Appl. No.: 17/622,013

(22) PCT Filed: Jun. 22, 2020

(86) PCT No.: PCT/US2020/038946
§ 371 (c)(1),
(2) Date: Dec. 22, 2021

(87) PCT Pub. No.: WO2020/263744
PCT Pub. Date: Dec. 30, 2020

(65) Prior Publication Data
US 2022/0258521 A1 Aug. 18, 2022

Related U.S. Application Data

(60) Provisional application No. 62/866,722, filed on Jun. 26, 2019.

(51) Int. Cl.
*B42D 25/305* (2014.01)
*B42D 25/373* (2014.01)
(Continued)

(52) U.S. Cl.
CPC ......... *B42D 25/373* (2014.10); *B42D 25/305* (2014.10); *B42D 25/382* (2014.10); *B42D 25/387* (2014.10); *B42D 25/47* (2014.10)

(58) Field of Classification Search
CPC .. B42D 25/305; B42D 25/382; B42D 25/387; B42D 25/47; G06K 2019/06225
(Continued)

(56) References Cited

U.S. PATENT DOCUMENTS 3,904,642 A 9/1975 Mach et al.
4,005,111 A 1/1977 Mach et al.
(Continued)

FOREIGN PATENT DOCUMENTS

CN 101688072 A 3/2010
CN 103102735 A 5/2013
(Continued)

OTHER PUBLICATIONS

JP-2005338656-A English Translation (Year: 2005).*
(Continued)

*Primary Examiner* — Kyle R Grabowski
(74) *Attorney, Agent, or Firm* — Kagan Binder, PLLC

(57) ABSTRACT

The present invention allows spectral codes to be accurately and consistently deployed for a wide range of labels and substrates or products. Spectral codes provided by one or more taggants are incorporated into transferable images so that these images can be prepared separately under accurate, controlled conditions and then transferred onto labels or other substrates. The transferable images that include one or more taggants further include a metal foil layer that is both highly opaque and thin so that the foil is highly compatible with image transfer techniques.

29 Claims, 20 Drawing Sheets

(51) Int. Cl.
*B42D 25/382* (2014.01)
*B42D 25/387* (2014.01)
*B42D 25/47* (2014.01)

(58) Field of Classification Search
USPC .......................................................... 235/491
See application file for complete search history.

(56) References Cited

U.S. PATENT DOCUMENTS

| | | | |
|---|---|---|---|
| 4,089,995 A | | 5/1978 | Ferro et al. |
| 4,390,452 A | | 6/1983 | Stevens |
| 5,059,245 A | | 10/1991 | Phillips et al. |
| 5,135,569 A | | 8/1992 | Mathias |
| 5,172,936 A | | 12/1992 | Sullivan et al. |
| 5,314,767 A | | 5/1994 | Bussard |
| 5,380,695 A | | 1/1995 | Chiang et al. |
| 5,484,167 A | | 1/1996 | Donaldson et al. |
| 5,603,259 A | | 2/1997 | Gross et al. |
| 5,674,622 A | | 10/1997 | Burns et al. |
| 5,710,197 A | | 1/1998 | Fischer et al. |
| 5,781,316 A | | 7/1998 | Strahl et al. |
| 5,829,789 A | | 11/1998 | Treleaven et al. |
| 6,153,123 A | | 11/2000 | Hampden-Smith et al. |
| 6,165,384 A | | 12/2000 | Cooper et al. |
| 6,165,592 A | * | 12/2000 | Berger ................. B42D 25/373 428/209 |
| 6,375,864 B1 | | 4/2002 | Phillips et al. |
| 6,483,576 B1 | | 11/2002 | Gardner |
| 6,492,093 B2 | | 12/2002 | Gaschler et al. |
| 6,572,784 B1 | | 6/2003 | Coombs et al. |
| 6,632,783 B1 | | 10/2003 | Giblin et al. |
| 6,676,852 B2 | | 1/2004 | Brown et al. |
| 6,813,011 B2 | | 11/2004 | Gardner et al. |
| 6,861,012 B2 | | 3/2005 | Gardner et al. |
| 7,038,766 B2 | | 5/2006 | Kerns et al. |
| 7,122,076 B2 | | 10/2006 | Vonwiller et al. |
| 7,407,538 B2 | | 8/2008 | Jackson |
| 7,497,972 B2 | | 3/2009 | Lichtenstein et al. |
| 7,531,108 B2 | | 5/2009 | Hampden-Smith et al. |
| 7,547,894 B2 | | 6/2009 | Agrawal et al. |
| 7,674,532 B2 | | 3/2010 | Einhorn et al. |
| 7,773,162 B2 | | 8/2010 | Nendel |
| 7,903,281 B2 | | 3/2011 | Encrenaz et al. |
| 8,034,436 B2 | | 10/2011 | Wei |
| 8,159,657 B2 | | 4/2012 | Degott et al. |
| 8,330,122 B2 | | 12/2012 | Smith et al. |
| 8,360,323 B2 | * | 1/2013 | Widzinski, Jr. ....... G09F 3/0294 235/487 |
| 8,362,130 B2 | | 1/2013 | Demartin Maeder et al. |
| 8,822,954 B2 | | 9/2014 | Li et al. |
| 8,828,271 B2 | | 9/2014 | Zhang |
| 9,021,953 B2 | | 5/2015 | Barthram et al. |
| 9,162,513 B2 | | 10/2015 | Pawlik et al. |
| 9,342,999 B2 | | 5/2016 | Key |
| 9,444,981 B2 | | 9/2016 | Bellis et al. |
| 9,822,266 B2 | | 11/2017 | Okamoto et al. |
| 9,878,574 B2 | | 1/2018 | Merchant |
| 10,407,579 B2 | | 9/2019 | Yamanaka et al. |
| 2002/0025490 A1 | | 2/2002 | Shchegolikhin et al. |
| 2004/0151827 A1 | | 8/2004 | Argoitia et al. |
| 2005/0031838 A1 | | 2/2005 | Lagunowich et al. |
| 2005/0100204 A1 | | 5/2005 | Afzal et al. |
| 2005/0142342 A1 | * | 6/2005 | Lutz ......................... B41M 5/34 428/211.1 |
| 2005/0178841 A1 | | 8/2005 | Jones, II et al. |
| 2007/0029787 A1 | | 2/2007 | Loftin, III et al. |
| 2007/0119951 A1 | | 5/2007 | Auslander et al. |
| 2007/0205284 A1 | | 9/2007 | Ross |
| 2008/0006615 A1 | | 1/2008 | Rosario et al. |
| 2009/0033932 A1 | | 2/2009 | Gibson |
| 2009/0141961 A1 | * | 6/2009 | Smith .................... G06V 20/80 382/135 |
| 2009/0251749 A1 | * | 10/2009 | O'Boyle ................ B42D 15/00 359/2 |
| 2010/0242793 A1 | | 9/2010 | Greb et al. |
| 2010/0288943 A1 | | 11/2010 | Lambert |
| 2011/0127763 A1 | | 6/2011 | Benenati et al. |
| 2011/0283369 A1 | | 11/2011 | Green |
| 2012/0003071 A1 | | 1/2012 | Yoshimoto et al. |
| 2012/0133121 A1 | | 5/2012 | Bleikolm et al. |
| 2013/0153118 A1 | | 6/2013 | Friedrich |
| 2015/0223580 A1 | | 8/2015 | Kinney et al. |
| 2015/0317923 A1 | | 11/2015 | Edmonds et al. |
| 2017/0032285 A1 | | 2/2017 | Sharma et al. |
| 2017/0076923 A1 | | 3/2017 | Yuan et al. |
| 2018/0075685 A1 | | 3/2018 | Hussain et al. |
| 2018/0197052 A1 | | 7/2018 | Yanson et al. |
| 2019/0236614 A1 | | 8/2019 | Burgin et al. |
| 2019/0370514 A1 | | 12/2019 | Lawandy |
| 2022/0281259 A1 | | 9/2022 | Brogger et al. |
| 2022/0334054 A1 | | 10/2022 | Brogger et al. |
| 2023/0298044 A1 | | 9/2023 | Brogger et al. |

FOREIGN PATENT DOCUMENTS

| | | | | |
|---|---|---|---|---|
| CN | 104830155 A | | | 8/2015 |
| CN | 104877433 A | | | 9/2015 |
| CN | 104893416 A | | | 9/2015 |
| DE | 10 2010 026 782 | A1 | | 1/2012 |
| EP | 0587178 | A2 | | 9/1993 |
| JP | 2005338656 | A | * | 12/2005 |
| JP | 2008201065 | A | | 9/2008 |
| JP | 2012044614 | A | | 8/2012 |
| JP | 2012144614 | A | * | 8/2012 |
| JP | 2013196165 | A | * | 9/2013 |
| JP | 2015196819 | A | | 11/2015 |
| KR | 10-1038035 | A | | 6/2005 |
| KR | 10-1411063 | A | | 8/2008 |
| KR | 20130140340 | A | * | 12/2013 |
| KR | 20170034600 | A | | 3/2017 |
| WO | 02/103659 | A1 | | 12/2002 |
| WO | 2015125224 | A1 | | 8/2015 |
| WO | 2016052641 | A1 | | 4/2016 |
| WO | 2017/201540 | A1 | | 11/2017 |
| WO | 2020/025696 | A1 | | 2/2020 |
| WO | 2020263744 | A1 | | 12/2020 |
| WO | 2021/041688 | A1 | | 3/2021 |
| WO | 2021/048539 | A1 | | 3/2021 |
| WO | 2021055573 | A1 | | 3/2021 |
| WO | 2022/040304 | A1 | | 2/2022 |
| WO | 2022/266208 | A2 | | 12/2022 |

OTHER PUBLICATIONS

PCT/US2020/038946, International Search Report and the Written Opinion of the International Searching Authority, dated Sep. 24, 2020, 12 pgs.

PCT/US2020/051229, International Search Report and Written Opinion of the International Searching Authority, dated Feb. 4, 2021, 15 pgs.

PCT/US2020/048215, International Search Report and Written Opinion of the International Searching Authority, dated Dec. 7, 2020, 9 pgs.

PCT/US2021/046491, International Search Report and Written Opinion, dated Aug. 12, 2021, 13 pgs.

U.S. Appl. No. 17/760,979, filed Mar. 16, 2022, by Brogger et al., and titled Taggant Systems With Remotely Detectable Spectral Signatures.

U.S. Appl. No. 17/637,683, filed Feb. 23, 2022, by Brogger et al., and titled Standardization of Taggant Signatures Using Transfer Images.

PCT/US22/33605, International Search Report and Written Opinion, ISA/US, date of mailing Dec. 2, 2022, total 6 pages.

G. Pfaff, "Special Effect Pigments," in High Performance Pigments, Wiley-VCH, 2002, pp. 77-101.

Ruff Lukas et al., "A Unifying Review of Deep and Shallow Anomaly Detection", Proceedings of the IEEE, vol. 109, No. 5, ( May 2021) pp. 756-795, XP011851623, ISSN 0018-9219, doi 10.1109/JPROC.2021.3052449.

(56) References Cited

OTHER PUBLICATIONS

Alberto Signoroni et al., "Deep Learning Meets Hyperspectral Image Analysis: A Multidisciplinary Review", J. Imaging, 5, 52 (2019), pp. 1-32; www.mdpi.com/joumal/ jimaging; doi 10.3390/ jimaging5050052.
Jinwon An et al., "Variational Autoencoder based Anomaly Detection using Reconstruction Probability", SNU Data Mining Center, 2015-2 Special Lecture on IE, pp. 1-18.
Sertac Arisoy et al., "Unsupervised Pixel-wise Hyperspectral Anomaly Detection via Autoencoding Adversarial Networks", ARXIV.ORG, Cornell Univ. Library, Jan. 21, 2021, pp. 1-6, doi 10.1109/LGRS. 2021.3049711.
EP Appln No. 22825741.6, Extended European Search Report (ESSR), European Patent Office, Feb. 20, 2025, 10 pages.

* cited by examiner

STANDARDIZATION OF TAGGANT SIGNATURES USING TRANSFER IMAGES

PRIORITY CLAIM

The present nonprovisional patent application claims priority to International Application No. PCT/US2020/038946, filed on Jun. 22, 2020, which in turn claims priority under 35 U.S.C. § 119(e) from United States Provisional patent application having Ser. No. 62/866,722, filed on Jun. 26, 2019, entitled STANDARDIZATION OF TAGGANT SIGNATURES USING TRANSFER IMAGES, the entireties of which are respectively incorporated herein by reference for all purposes.

FIELD OF THE INVENTION

The present invention relates to label strategies in which one or more taggants are incorporated into transfer images. In particular, the taggants are incorporated into images that are transferred onto other labels or directly to products, documents, packages, or other substrates. In some embodiments the transfer images are affixed to substrates with adhesives such as hot melt and/or pressure sensitive adhesives. In some embodiments, inks used to form the images also function as the adhesive to bond the images to the substrates.

BACKGROUND OF THE INVENTION

Many documents, packages, consumer products, industrial products, and product combinations are known for which it is useful to be able to automatically identify and/or authenticate the items or workpieces. This would allow appropriate automated processes, identification, authentication, inventory practice, pricing, remote data harvesting, or the like can be carried out. Examples of such products and product combinations include food and beverage preparation systems; personal care products; medical care items such as glucose test strips and their corresponding glucose monitoring; pharmaceutical or nutraceutical materials such as respiratory medicines stored in sealed packages and corresponding inhaler devices; consumer worn devices such as disposable hybrid microfluidic devices; smart contact lenses integrated with glucose sensors; printers and ink cartridges; capital equipment and corresponding consumables such as belts, adhesive pads, and fasteners; lab analysis equipment and corresponding consumables such as lab testing units, pipettes, vials; aircraft engines and corresponding consumables such as cleaning solutions, jointing, crack detection, and feeder rollers; check scanners in the banking industry and corresponding consumables such as ink jet cartridges; franking rollers, cleaning cards, and feeder rollers; industrial machines and corresponding consumables such as squeegees, batteries, brushes, hoses, filters, and engine parts; product and packaging labels; and the like.

Products liability protection also may benefit from authentication strategies that allow a company to easily distinguish its own products from products of others. Any product susceptible to source confusion, counterfeiting, or grey market importation can benefit from identification and authentication strategies. Marketing strategies also may involve remotely gathering data from products being used so that marketing decisions, customer service, product performance, and the like can be managed or improved.

Bar codes have been placed on products as one technique to quickly identify a product. As a result of the large and growing scale of the Internet of Things (IOT), barcode data is being imaged (e.g., through scanning or 2D image capture), transmitted, and remotely processed. It can be challenging to verify if a local bar code or if bar code data being transmitted is from a particular source. Bar codes are not able to easily solve this problem on their own. Even if information in a bar code is encrypted, a bar code is easily copied. Bar code fakes are easy to pass as an authentic bar code.

One way to help to securely identify bar codes is to use these in combination with a spectral signature system that provides a secondary way to confirm that a product marked with a bar code has been supplied from a particular source. Spectral signatures can be deployed that are very difficult to counterfeit or otherwise use without authority. Hence, spectral signatures augment authentication and identification strategies. In view of so many security benefits, spectral codes also can be incorporated onto substrates even when no bar codes or other form of machine readable indicia might be present.

One way to create spectral signatures and incorporate these onto substrates involves using one or more taggants to encode the desired signature. The taggants may be incorporated into inks that are printed onto the desired substrate. Such inks have been referred to in the industry as spectral inks.

Generally, a taggant is a compound that emits spectral or optical characteristics in response to one or more designated triggering events. The optical characteristics of interest may be visible to the unaided human eye and or only readable by machine, such as by a suitable detector. Examples of taggant compounds include luminescent compounds (fluorescent and phosphorescent compounds, e.g.) that emit a luminescent optical characteristic in response to illumination with light of suitable intensity and wavelength(s); phosphor compounds that emit light in response to suitable illumination; light absorbing compounds that preferentially absorb or transmit certain wavelengths (e.g., infrared absorbing compounds that preferentially absorb infrared wavelengths); combinations of these; and the like.

Taggant-based signatures are more secure and harder to duplicate when the spectral signature is encoded in machine readable spectra emitted by a taggant compound. Taggant-based signatures also can be made more secure and harder to duplicate when a combination of two or more taggant compounds are used. Taggant-based signatures also can be made more secure and harder to duplicate when taggant combinations are used in which the composite spectral response differs and is not recognizable from the respective spectral responses of the individual taggant compounds.

The result is that a spectral signature can be encoded in the spectral response of a taggant system including one or more taggant compounds. The spectral signature or code is like a fingerprint to which a user can assign a particular meaning. Spectral signatures can be overt or covert and are used for a wide variety of applications.

A spectral signature can be encoded in spectral responses of taggant compounds in a variety of different ways. As one example, a spectral signature system may be encoded in color channels (e.g., one or more different wavelength bands, wherein the different channels may be different wavelength bands that do not overlap and/or may include wavelength bands that overlap to some extent) associated with spectral characteristics emitted by a taggant system when the system is illuminated with illumination or a sequence of different wavelength bands illumination. Each channel resulting from each illumination may be assigned, for example, a corresponding value based on the integrated intensity of the captured light in the channel. In the case of a system that uses 7 different illuminations and captures spectral information for each illumination in which the captured spectrum is divided into 6 different color channels, a spectral signature can be encoded in the resultant 42 different data values (i.e., 7 illuminations×6 channels). The resultant spectral signature or code is analogous to a password with 42 different characters or zones. It would be hard to counterfeit such a code without access to the proper taggant system.

The number of characters or zones used to define the signature can be further increased by also defining functional relationships (e.g., intensity ratios) that must be met in the specified signature. Thus, encoding also may rely not only on individual characteristics associated with each channel, but also on the relationships among characteristics of different channels to create even more complexity and security. Detectors and corresponding systems may be used that use even more illumination colors, channels, and the like.

A taggant system may be deployed in a variety of different ways. According to one strategy, a taggant system is incorporated into printable inks. These inks are then printed onto the desired substrate in one or more layers optionally in combination with one or more other printed features or structures. One concern that impacts spectral signature security concerns the consistency by which the taggant system can be deployed. If high consistency can be achieved, then a spectral signature may be defined by signature zones or characters with tighter tolerances. This makes the signature more secure in as much as a tightly defined signature is harder to match by a counterfeit signature. In contrast, if it is hard to deploy a signature with a high degree of consistency, then a signature may need to be defined by wider zones or characters, i.e., less strict tolerances, to ensure that the more variable population of authentic signatures will pass muster. Unfortunately, a signature defined by less strict standards can be easier to counterfeit, as a wider range of spectral responses will provide a match.

It follows that signature definitions with tightly defined tolerances are more desirable for enhanced security against signature counterfeiting. Unfortunately, many factors may influence the degree to which a signature can be as consistently deployed as might be desired. Factors that influence consistency include the purity of the taggants, the ratio of the taggants, the uniformity of the spectral inks into which the taggants are incorporated, printing equipment and settings, variations in printing equipment maintenance, how the inks are mixed or recirculated, ambient conditions at the time of printing, practices of different press operators, plate materials, mounting tape used on printing plates, age and cleanliness of anilox rollers, anilox cell configuration, printing uniformity, storage of the printed taggants, subsequent handling of the printed taggants and the like.

Unfortunately, print variations can cause tremendous variations in the printed signatures, mandating that looser signature tolerances be used to accommodate the variations. The variations are exacerbated when inks are used at multiple print locations, where variations are correspondingly multiplied. It is very difficult to achieve the same spectral signature tolerances at multiple printers even when using the exact same taggant ink. It can even be the case that the different printing locations end up printing vastly different signatures using the same taggant inks. The variation among printing facilities requires that spectral signature zones be defined and detectors to be programmed with looser tolerances in order to accommodate so much variation.

Further, even if printed to high standards, the material, color characteristics and/or light transmissivity of both the printed taggant image and the substrate or product on which the printed taggant image is applied can also cause significant variation of the signature. For example, the substrate or product color and opacity could also influence the taggant spectral signature that is read by a detector.

The result is that there can be significant variation in the way in which the spectral code is deployed, even when the same spectral inks are used. Considering all variabilities among the factors influencing consistent signature deployment, it is very difficult using conventional practices to fully optimize and narrowly define a taggant signature system to its fullest potential. This results in taggant signatures that are much less secure than desired. Accommodating these variations by less strict signature definitions makes the signatures easier to counterfeit or results in false positives from the detectors by using similar materials.

If strict code tolerances were to be somehow possible notwithstanding all these different factors undermining consistency, it would be much more difficult to counterfeit a taggant signature or cause false positives from detectors. To date, chemistry, ink formulation and detector design and algorithms can be tightly controlled. The main issues undermining signature consistency include variations associated with printing and variations associated with how the signature will ultimately be used.

Accordingly, there is a strong need for spectral signature strategies that allow spectral signatures to be more consistently deployed by eliminating the majority of variables inherent in different label substrates, printing techniques and substrates on which the printed taggant image is applied. Indeed, a so-called universal signature would be highly desired, wherein "universal" indicates that the spectral signature is virtually the same and of tight tolerance by eliminating the majority of the variables inherent in the current process.

SUMMARY OF THE INVENTION

The present invention provides spectral code strategies that allow spectral codes (also referred to herein as spectral signatures) to be accurately and consistently deployed in a wide range of labels and substrates or products. The one or more taggants that result in the spectral codes are incorporated into transferrable images so that these images can be prepared separately under accurate, controlled conditions at a single source and then transferred onto a label or other substrate to appear to be part of the original printing rather than a separate item added later. This can allow a taggant signature to be added to a label, document, product, package, or other substrate in a manner that looks more professional even though the transfer image is added after other label portions have already been printed and even though the spectral transfer image was prepared separately.

As a further advantage, the transferrable images that include one or more taggants further include a metal foil layer that is both highly opaque and extremely thin. Being so thin, the foil is highly compatible with image transfer techniques: Being so opaque, the foil blocks the label material or substrate/product from impacting the spectral signature range/zone. This allows spectral codes to be universally standardized, applied at a variety of print locations and used on a wide range of substrates while still being encoded with very strict tolerances. Due to the ability to accurately read the spectral code with de minimis substrate interference, and the elimination of print variance advance knowledge of the substrate and printer consistencies is not needed to encode the signature or to program corresponding detectors to strict tolerances.

The metal foil helps to provide desirable opacity even when one or more solid base colors are provided between spectral inks and the metal foil. The reason is that the one or more base color may be insufficiently opaque in circumstances in which the taggant system is used on substrates having a strong color or that are transparent or translucent. The color(s) or backlighting through a label or image on such a substrate can unduly interfere with the spectral response of the taggant system. The metal foil is sufficiently opaque to substantially negate color and backlighting effects on the transferred images.

As used herein a transferable image (also referred to as a transferable body) refers to an image that is formed on a suitable carrier, wherein the image can be moved to another surface upon contact, usually with the aid of heat, pressure, and or a liquid medium. The device formed by the carrier and transferable image while the transferable image is held on the carrier is referred to as a transfer or decal or transfer label. Typically, the transferable image, even though it includes a metal foil, is not self-supporting in the sense that it would fall apart, crumble, or otherwise degrade if not supported on a self-supporting substrate surface.

In one aspect, the present invention relates to a spectrally responsive transfer system, comprising:

a) a taggant system comprising one or more taggants, said one or more taggants exhibiting spectral characteristics in response to at least one illumination;
b) a spectral code associated with the spectral characteristics of the taggant system;
c) at least one transfer device releasably supported on a carrier, each transfer device comprising a spectrally responsive transferable body releasably supported in an upside down orientation on the carrier in a'manner to allow the transferable body to be transferred from the carrier to a substrate, wherein the transferable body comprises:
    1) at least one spectral ink layer that is releasably coupled to the carrier, wherein the at least one spectral ink layer incorporates the taggant system;
    2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the substrate; and
    3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate.

In one aspect, the present invention relates to a spectrally responsive transfer system, comprising:

a) a taggant system comprising one or more taggants, said one or more taggants exhibiting spectral characteristics in response to at least one illumination;
b) a spectral code associated with the spectral characteristics of the taggant system;
c) at least one transfer device releasably supported on a carrier, each transfer device comprising a spectrally responsive transferable body releasably supported in an upside down orientation on the carrier in a manner to allow the transferable body to be transferred from the carrier to a substrate, wherein the transferable body comprises:
    1) at least one spectral ink layer that is releasably coupled to the carrier, wherein the at least one spectral ink layer incorporates the taggant system;
    2) at least one base color layer provided over the at least one spectral ink layer such that the at least one base color layer overlies the at least one spectral ink layer when the transferable body is releasably supported on the carrier and such that the at least one base color underlies the at least one spectral ink layer when the transferable body is transferred from the carrier onto the substrate;
    3) at least one metal foil layer provided over the at least one base color layer such that the metal foil layer overlies the at least one base color layer when the transferable body is releasably supported on the carrier and such that the metal foil layer underlies the at least one base color layer when the transferable body is transferred from the carrier onto the substrate; and
    4) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate.

In another aspect, the present invention relates to a spectral signature system, comprising a) a taggant system comprising one or more taggants, said one or more taggants exhibiting spectral characteristics in response to at least one illumination;
b) a spectral code associated with the spectral characteristics of the taggant system;
c) at least one transfer device releasably supported on a carrier, each transfer device comprising a transferable body releasably supported in an upside down orientation on the carrier in a manner to allow the transferable body to be transferred to a substrate, wherein the transferable body comprises:
    1) at least one spectral ink layer that is releasably coupled to the carrier, wherein the at least one spectral ink layer incorporates the taggant system;
    2) at least one metal foil layer provided over the at least spectral ink layer such that the metal foil layer overlies the at least one spectral ink layer when the transferable body is releasably supported on the carrier and such that the metal foil layer underlies the at least one spectral ink layer when the transferable body is transferred from the carrier onto the substrate; and
    3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate.
d) an illumination system that emits at least one illumination in a manner such that when the transferable body is transferred from the carrier onto a substrate to become a transferred body and is illuminated by an illumination, the transferred body emits a spectral response that encodes the spectral code;

e) at least one detector that detects the spectral response; and f) a control system comprising program instructions that evaluate information comprising the spectral response to determine information indicative of whether the spectral code is detected.

In another aspect, the present invention relates to a spectral signature system, comprising a) a taggant system comprising one or more taggants, said one or more taggants exhibiting spectral characteristics in response to at least one illumination;

b) a spectral code associated with the spectral characteristics of the taggant system;

c) at least one transfer device releasably supported on a carrier, each transfer device comprising a transferable body releasably supported in an upside down orientation on the carrier in a manner to allow the transferable body to be transferred to a substrate, wherein the transferable body comprises:

1) at least one spectral ink layer that is releasably coupled to the carrier, wherein the at least one spectral ink layer incorporates the taggant system;

2) at least one base color layer provided on the at least one spectral ink layer such that the at least one base color layer overlies the at least one spectral ink layer when the transferable body is releasably supported on the carrier and such that the at least one base color underlies the at least one spectral ink layer when the transferable body is transferred from the carrier onto the substrate;

3) at least one metal foil layer provided over the at least one base color layer such that the metal foil layer overlies the at least one base color layer when the transferable body is releasably supported on the carrier and such that the metal foil layer underlies the at least one base color layer when the transferable body is transferred from the carrier onto the substrate; and 4) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate.

d) an illumination system that emits at least one illumination in a manner such that when the transferable body is transferred from the carrier onto a substrate to become a transferred body and is illuminated by an illumination, the transferred body emits a spectral response that encodes the spectral code;

e) at least one detector that detects the spectral response; and f) optionally a control system comprising program instructions that evaluate information comprising the spectral response to determine information indicative of whether the spectral code is detected.

In another aspect, the present invention relates to a method of making a spectrally coded substrate, comprising the steps of:

a) providing at least one transfer device releasably supported on a carrier, each transfer device comprising a transferable body releasably supported in an upside down orientation on the carrier in a manner to allow the transferable body to be transferred to a substrate, wherein the transferable body comprises:

1) at least one spectral ink layer that is releasably coupled to the carrier, wherein the at least one spectral ink layer incorporates the taggant system, said taggant system comprising one or more taggants;

2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the additional label; and 3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the additional label; and b) transferring a transferable body associated with the substrate from the carrier onto the substrate to thereby provide the spectrally coded substrate.

In another aspect, the present invention relates to a method of making a spectrally coded label, comprising the steps of a) providing at least one transfer device releasably supported on a carrier, each transfer device comprising a transferable body releasably supported in an upside down orientation on a carrier in a manner to allow the transferable body to be transferred to the label, wherein the transferable body comprises:

1) at least one spectral ink layer that is releasably coupled to the carrier, wherein the at least one spectral ink layer incorporates the taggant system, said taggant system comprising one or more taggants;

2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the label; and 3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the label; and b) transferring a transferable body associated with the label from the carrier onto the label to thereby provide the spectrally coded label.

DETAILED DESCRIPTION OF PRESENTLY PREFERRED EMBODIMENTS

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
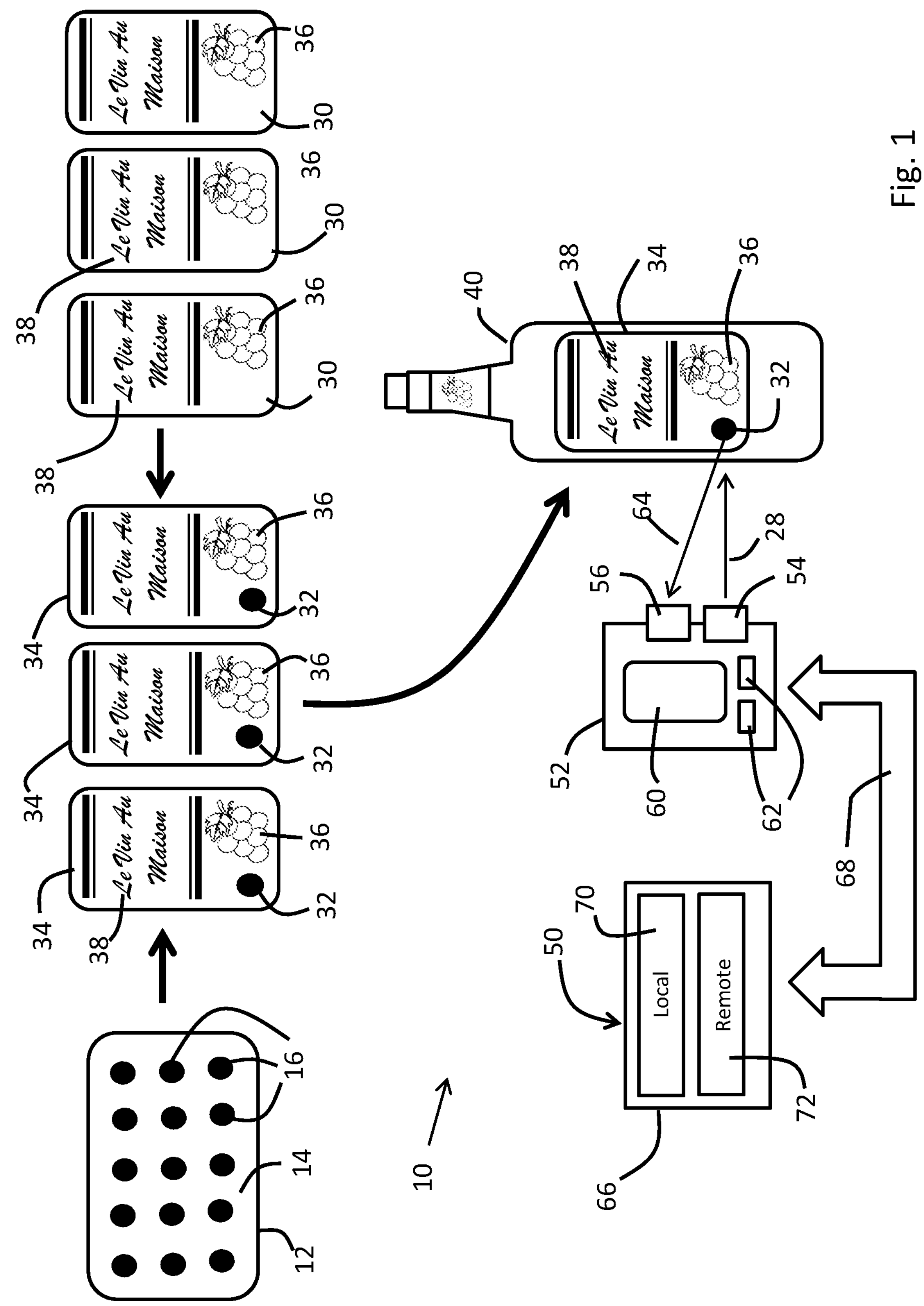
FIG. 1 schematically illustrates one embodiment of a spectral code system of the present invention.
Figure 3:
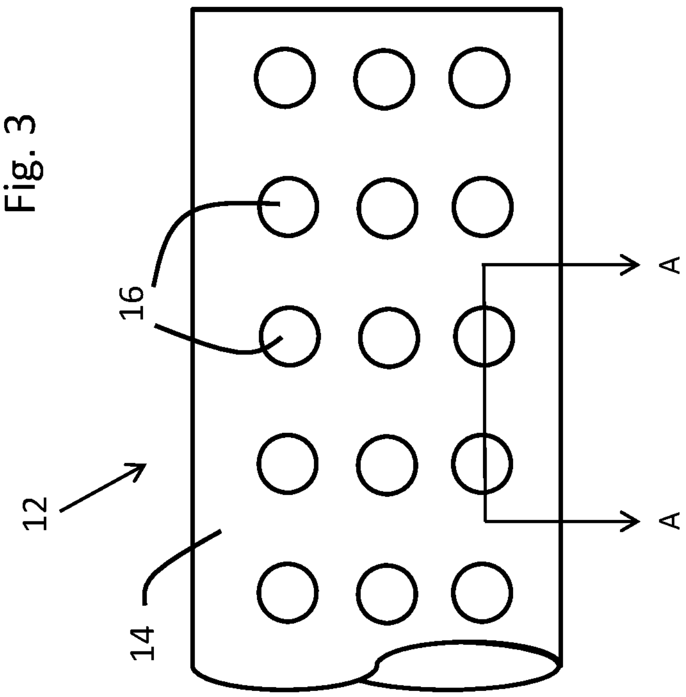
FIG. 3 is a top view of a portion of the transfer device of FIG. 1.
Figure 2:
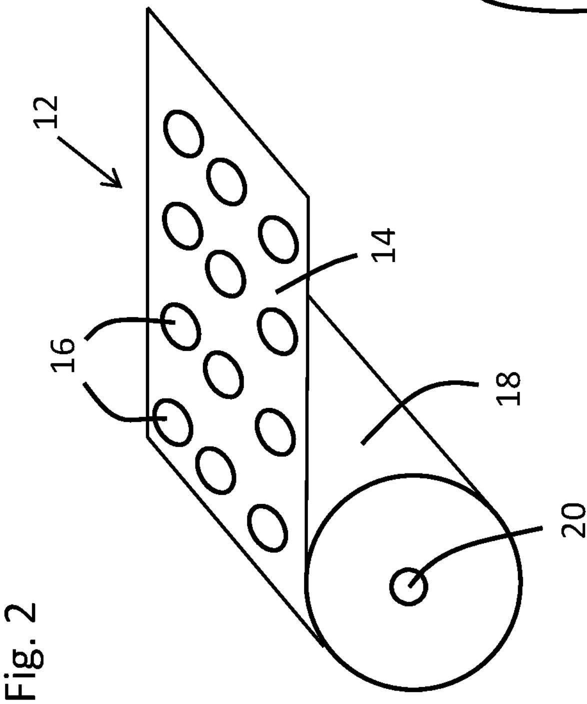
FIG. 2 is a schematic perspective view of a transfer device of the present invention including an array of heat transfer images supported on a carrier, wherein the carrier is stored as a supply roll wound on a spool, and wherein the heat transfer images incorporate a taggant system that is associated with the taggant system (e.g., a spectral code is encoded in the spectral response of the taggant system.

FIGS. 1 through 4*b* schematically illustrate one embodiment of a spectral code system 10 of the present invention. For purposes of illustration, system 10 is shown using a spectrally responsive transfer, system in the form of heat transfer device 12 (also referred to as "heat transfer label device 12"). Although FIGS. 1 through 4*b* involve heat transfer device 12 with heat transfer functionality, the transfer device 12 may include transferable images that may be shifted from transfer device 12 to another surface using any suitable transfer technique. For example, other transfer techniques may occur without heat but are assisted with pressure, a solvent, a transfer medium, or the like. FIG. 2 shows how heat transfer device 12 may be provided in the form of a supply roll 18 wound on spool 20.

Heat transfer device 12 includes carrier 14 that supports an array of heat transfer images 16. The heat transfer images 16 incorporate a taggant system 22 (see FIGS. 4*a* and 4*b*). A spectral code is associated, desirably pre-associated, with the taggant system 22. For example, the spectral code may be encoded in spectral characteristics of the taggant system 22. Taggant system 22 includes one or more taggants that independently emit spectral characteristics in response to suitable, triggering illumination 28. For purposes of illustration, taggant system 22 includes two taggants in the form of first taggant compound 24 and second taggant compound 26. Other embodiments of taggant system 22 may include a single taggant. Other embodiments of taggant system 22 may include three or more taggants.

In the practice of the present invention, heat transfer device 12 can be used to incorporate the spectral code onto labels 30 to thereby provide spectrally coded labels 34. For example, FIG. 1 shows how the heat transfer images 14 on heat transfer device 12 may be transferred in register onto labels 30 in order to provide corresponding transferred images 32 on spectrally coded labels 34. Spectrally responsive means that the transferred images 32 cause the labels 34 to incorporate the taggant system 22 and, therefore, the associated spectral code. When the transferred images 32 are illuminated with corresponding illumination 28, a suitable detector device such as device 52 can both illuminate the images 32 with illumination 28 and read the corresponding spectral response 64 to detect the spectral code. Device 52 can illuminate a target with more than one type of illumination, often occurring in sequence, while detecting the spectral response associated with each type of illumination with one or more detectors. Detection may occur using a wide variety of sensors such as color chips, photodiodes, CMOS arrays, combinations of these and the like. Detection strategies may use a variety of sensing strategies such as image capture, spectrometer detection, hyperspectral analysis, multispectral analysis, scanning, raman detection, combinations of these, and the like. Sensors can be fit with one or more optical filters to limit or otherwise modify the captured light.

In addition to transferred images 32, the spectrally coded labels 34 may include other indicia. For purposes of illustration, such other indicia may include graphic indicia 36, printed indicia 38, one or two dimensional bar code image(s) (not shown), or the like. As shown in FIG. 1, such other indicia may be present on labels 30 prior to the time that images 16 are transferred onto those labels 34 as transferred images 32. Such other indicia also may be applied to labels 32 in whole or in part after heat transferred images 32 are provided on the labels 34. Product indicia can convey different information associated with the label and the substrate onto which the label is applied. Example of such information includes the source of the substrate, the type of substrate, the brand name of the substrate, or components, instructions or a code linked to instructions for using the substrate, and/or the like.

Spectrally coded labels 34 may be affixed to one or more substrates in order to label such substrates with desired label information as well as to incorporate the spectral code onto the substrate. For purposes of illustration, FIG. 1 shows how a label 34 is affixed onto a product in the form of a wine bottle 40.

As text indicia 38, label 34 includes a brand name ("Le Vin Au Maison") of the wine bottle product 40. Other text information may include a variety of other useful information such as SKU number, manufacturer, distributor, year, region of geographic origin, product type (e.g., cabernet sauvignon in the case of a wine product), ingredients, nutrition information, storage and serving instructions, and the like. Graphic indicia 36 include a logo image of grapes associated with the product 40. Further, transferred image 32 incorporates taggant system 22 so that the pre-associated spectral code is now also affixed to wine bottle 40. Wine bottle 40 is thereby rendered spectrally responsive in a manner effective to allow the signature code to be detected and read from image 32 on the wine bottle 40. In contrast, counterfeit or otherwise unauthorized products would not include the proper signature and thereby would be readily distinguished from proper products bearing the signature.

Figure 15:
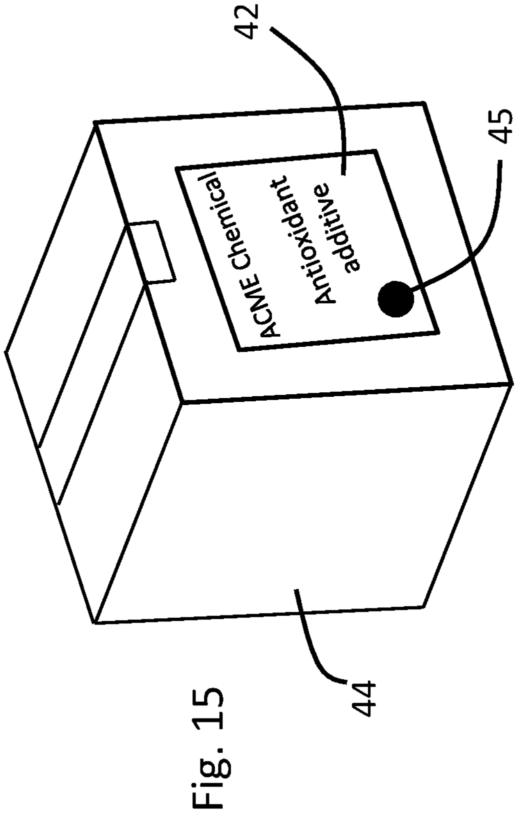
FIG. 15 shows an illustrative substrate in the form of a product package that bears a label of the present invention.
Figure 16:
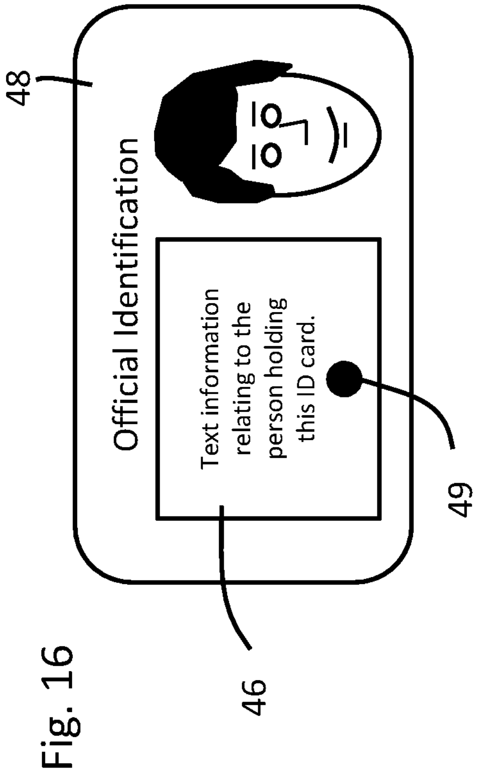
FIG. 16 shows an illustrative substrate in the form of an identification card that bears a label of the present invention.

Labels 34 may be modified with appropriate indicia to be useful on a wide range of other substrates including identification cards, apparel (clothes, shoes, headgear, and the like), packaging, motor vehicles, aircraft, marine craft, chemicals, construction and building materials, equipment, tools, electronics, appliances, food or beverage products, and the like. For example, FIG. 15 shows how a label 42 including spectrally responsive, heat and/or pressure transferred image 45 can be used on product packaging 44 for a chemical additive product. Image 45 incorporates a taggant system that is associated with a spectral code similar to the way that taggant system 22 does so. As another example, FIG. 16 shows how a label 46 including spectrally responsive, heat and/or pressure transferred image 49 can be used on an identification card 48. Image 49 incorporates a taggant system that encodes a pre-associated spectral code similar to the way that taggant system 22 does so.

The affixation of labels 34 incorporating the corresponding transferred images 32 onto substrates/products such as wine bottle 40 provides many beneficial uses and advantages, as this associates the corresponding spectral code with the labeled substrate/products. Spectral code strategies allow items or workpieces to be automatically identified or authenticated for purposes of carrying out activities such as preparation or other manufacturing, inventory control, pricing (e.g., grocery checkout) systems, identification, authentication, malware protection, remote data harvesting, or the like. Examples of such products and product combinations that benefit from spectral code strategies include food and beverage preparation systems, glucose test strips and their corresponding glucose monitoring, respiratory medicines stored in sealed packages and corresponding inhaler devices, and the like. Products liability protection also benefit from authentication strategies that allow a company's own products to be easily distinguished from products of others. Any product susceptible to source confusion, counterfeiting, or grey market importation can benefit from identification and authentication strategies. Marketing strategies also may involve remotely gathering data from products being used so that marketing decisions, customer service, product performance, and the like can be managed or improved.

Referring again mainly to FIG. 1, control system 50 can be used to determine if a target substrate such as label 34 on wine bottle 40 is encoded with a proper spectral code associated with taggant system 22. Control system 50 generally includes detector device 52 and controller 66. Communication pathway 68 allows communication between detector device 52 and controller 66. Some or even all aspects of controller 66 may be local components 70 that are incorporated into detector device 52 itself. Other aspects of controller 66 optionally may be incorporated into one or more remote server or other remote control components 72.

Detector device 52 generally includes an illumination system 54 that emits one or more different types of illumination 28. In some embodiments, illumination system 54 may provide illumination 28 that includes two or more, preferably 2 to 10 wavelength bands of illumination in sequence. These wavelength bands may be discrete so that the illuminations do not have overlapping wavelengths. In other instances, the wavelength bands may partially overlap. For example, an illumination providing predominantly illumination in the range from 370 nm to 405 nm would be distinct from an illumination providing predominantly illumination in a range from 550 nm to 590 nm. As another example, three illuminations in the wavelength ranges 380 nm to 430 nm, 410 nm to 460 nm, and 440 nm to 480 nm, respectively are different types of illumination even though each partially overlaps with at least one other wavelength band.

Illumination system 54 may provide a wide variety of one or more kinds of illumination 28. Generally, illumination sources are used that are able to trigger appropriate spectral responses to the taggant materials incorporated into the selected taggant system 22. For example, illumination can include selected bands of the electromagnetic spectrum ultraviolet light, violet light, blue light, green light, indigo light, yellow light, orange light, red light, broad band light, infrared light, combinations of these, and the like. Ultraviolet (UV) light includes UV-C light having a wavelength in the range from 100 nm to 280 nm, UV-B light having a wavelength in the range from 280 nm to 315 nm, and UV-A light having a wavelength in the range from 315 nm to 400 nm. Some kinds of taggants may luminescently emit visible light under ambient illumination that could tint the transferred image 32. If such tinting is not desired, taggants may be used in taggant system 22 that luminesce in response to ultraviolet light, infrared light, and/or longer or shorter wavelengths that are not viewable to the unaided human eye. Such taggants would generally be invisible to the unaided human eye, thereby avoiding contributing an undesirable tint to the transferred image, but their spectral responses still could be easily triggered and detected. Many kinds of different illumination options can, be used. Light emitting diodes (LED's) are convenient illumination sources. LED's are reliable, inexpensive, uniform and consistent with respect to illumination wavelengths and intensity, energy efficient without undue heating, compact, durable, and reliable. Lasers, such as laser diodes, can be used for illumination as well. As one advantage, laser illumination would offer a benefit of increasing the taggant signal.

The spectral response 64 triggered by such illumination sequence can be read to determine if the proper signature code is present. The signature, for example, may involve zones associated with a plurality of detected wavelength bands for a plurality of different color channels for the different illumination wavelengths (e.g., different illumination colors). The illumination 28 is matched to the taggant system 22 so that illumination of a target bearing the associated taggant system 22 causes the system 22 to emit a spectral response 64 that encodes the pre-associated spectral code. In contrast, a target without the proper taggant system 22, such as a counterfeit label or unauthorized label, would not emit spectral characteristics that properly encode the spectral code if at all. Additionally, detector device 52 includes a sensor system 56 configured with one or more sensors to detect the spectral response 64 emitted by a target in response to illumination 28. The sensors may be fitted with optical filters if desired to help capture light within wavelength bands of interest while reducing or substantially excluding the capture of other light.

Detector device 52 further includes an output interface 60 to allow the user and device 52 to exchange communications. Interface 60 may incorporate a touch pad interface and/or lights whose color or pattern indicates settings, inputs, results, or the like. Interface 60 may as an option may include a voice chip or audio output to give audible feedback of pass/fail or the like. Additionally, controls 62 may be included to allow the user to interact with the detector device 52.

Controller 66 desirable includes program instructions that evaluate information including spectral response 64 to determine information indicative of whether the spectral characteristics associated with spectral response 64 encode the proper spectral code, thereby indicating that the illuminated target, which is label 34 in FIG. 1, includes the taggant system 22. The results of this evaluation can be communicated to a user through display of an appropriate output on the interface 60. The output can indicate information indicative that the taggant system is present (e.g., the spectral code is encoded in spectral response 64) or that the taggant system is not present (e.g., the spectral code is not encoded in the spectral response 64, or even that no spectral response is detected).

Figures 4A, 4B:
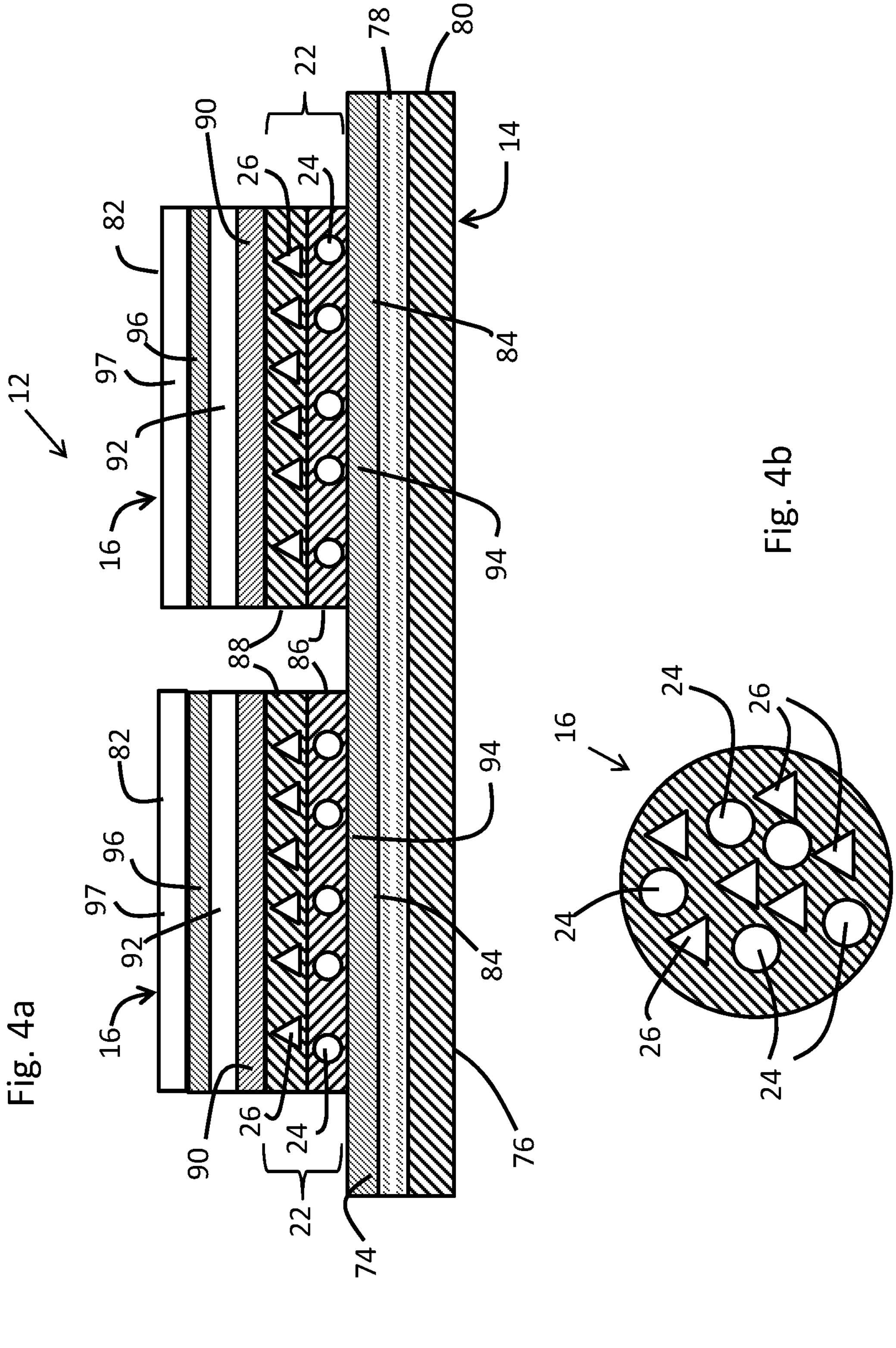
FIG. 4*a* is a schematic, side cross section view of a portion of the heat transfer image of FIG. 2 taken along section line A-A.
FIG. 4*b* is a schematic top view of a heat transfer image of FIG. 4A showing how the image incorporates a taggant system.

FIGS. 4*a* and 4*b* show more details of the transfer device 12 and the transfer images 16 supported on carrier 14. Heat transfer device 12 is described as including a multi-layer structure in which many of the layers may be applied using a variety of printing, lamination, and/or coating techniques to apply inks and foil material used to form the layers. Inks used in the practice of the present invention, such as the base color inks and spectral inks, top coat inks, adhesives, etc., may be solvent-based, aqueous or energy curable. The inks may be curable by air or heat drying or curable upon exposure to a suitable fluence of curing energy such as ultraviolet light, LED light, infrared light, electron beam (e-beam) energy, and/or the like.

Carrier 14 is in the form of a web that has a first face 74 that supports the heat transfer images 16. A second face 76 is on the other side of carrier 14. Carrier 14 includes a release layer 78 supported on a base sheet 80. Embodiments of carrier 14 including both base sheet 80 and release layer 78 are commercially available from a variety of commercial sources. Often, such products are ready to use as received. In other instances, it may be desirable to apply primer or surface treatment (e.g., corona treatment, irradiating with ultraviolet light, etc.) to the surface of the release layer 78 if desired, as priming may assist in the wet out or lay down of inks used to from the images 16 on carrier 14.

Base sheet 80 can be formed from a variety of man-made and/or synthetic materials including but not limited to paper, polymers, metallic films or foils, and/or the like. Base sheet 80 can be a continuous film, perforated, woven or nonwoven fibers, or the like. Base sheet 80 may have a single layer structure or a multi-layer structure.

Release layer 78 releasably holds the heat transfer images 16 on carrier 14 such that applying a suitable degree of heat and pressure allows the images 16 to be transferred away from carrier 14 onto a desired substrate such onto a label 30 to provide a spectrally responsive label 34. As is common in the transfer industry, a wax or silicone release layer would be a suitable embodiment of release layer 78.

Release layer 78 may cover all or a portion of base sheet 80. As illustrated, release layer 78 is formed as a continuous layer over substantially the entire base sheet 80. Such an embodiment makes carrier 14 suitable for a wide range of heat transfer applications, because different sizes, shapes, and arrays of images 16 could be releasably supported on carrier 14 without regard to having to register images 16 with underlying release regions. As an option, release layer 78 could be selectively formed only on regions of base sheet 80 that are intended to support images 16. Such an embodiment of carrier 14 would generally be customized to provide release properties for a specific deployment of releasable images 16.

Transferrable images 16 are multiple layer structures supported on carrier 14. Generally, each image 16 can be viewed as being formed "upside down" on carrier 14 with respect to the orientation of each image 16 after transfer to a desired target surface such as another label, document, product, package, or other substrate. The reason for this is that the outward face 82 of each image 16 as supported on carrier 14 will become the bottom face of the image 16 that becomes affixed to the desired substrate or target. In the meantime, interior face 84 of each image 16 as supported on carrier 14 becomes the upward, viewable face after image 16 is transferred to a substrate.

With this upside-down orientation in mind, each image 16 optionally may include a release layer 94. Release layer 94 may be provided as a flood coat continuously over carrier 14 in a manner similar to how release layer 78 is provided as a flood coat over base sheet 80. Alternatively, release layer 94 may be spot coated in regions associated with the footprint of each image 16. Desirably, when spot printed, the footprint of the spot printed release layer 78 is larger than the footprint of the image 16, and in particular, desirably is larger than the footprint of the printed spectral inks including the one or more taggants. This helps to ensure that the entirety of a transferred image 30 and its spectrally active region is covered and protected by release layer 94 after transfer. Regardless of whether release layer 94 is flood coated or spot coated, use of heat and optionally pressure in selected footprints helps to ensure that only the desired portion of release layer 94 is transferred.

As illustrated, release layer 94 does not include any taggant compounds. However, as an option in the practice of the present invention, one or more taggant compounds, including one or both of taggant compounds 26 and 28, may be incorporated into release layer 94 so that the material used to form release layer 94 also functions as a spectral ink.

As used herein, "provide on" or "provide over" with respect to how one layer is provided with respect to another layer means that the one layer is either provided directly or indirectly on the other layer. A first layer is directly provided on a second layer when the first and second layer are in contact with each other. A first layer is indirectly provided on a second layer when one or more other layers are interposed between the first and second layer.

Optional release layer 94 provides many advantages. Firstly, release layer 94 may help to allow transfer of images 16 more easily. In the presence of heat and/or pressure, some embodiments of release layer 94 allow images 16 to more easily release cleanly from carrier 14 with less risk of undue damage to the resultant transferred images 32 during the transfer. After image 16 is transferred to become a transferred imager 32, release layer 94 generally provides a protective, slip (non-stick), optically transparent coating over the underlying layers of transferred image 32. Additionally, the slip (non-stick) characteristics also help to provide a more effective release and transfer of the images 16 from carrier 14 to the desired substrate.

Layer 94 can be provided with a matte, satin, or glossy finish, as desired. Additionally, layer 94 can be opaque, translucent, optically clear or tinted. In embodiments in which taggant materials are incorporated into underlying layers of the transferred image, layer 94 desirably is sufficiently optically transparent to avoid adversely impacting the ability to illuminate the image 16 with illumination 28 and detect the spectral response 64 of underlying materials in a manner to determine if the proper spectral code is encoded in the response 64. Suitable optically clear topcoat materials are generally viewed as colorless inks but in practice may have pale colors such as a pale amber color. In other embodiments, if the taggant system 22 is incorporated into the release layer 94, release layer can be colored and/or opaque. If it is desirable to view underlying regions in case additional constituents (if any) of taggant system 22 or under the release layer 94 in the transferred image, then release layer 94 can include one or more windows through which the underlying taggant system can be illuminated.

The material(s) used to form layer 94 will be deemed to be optically transparent if the top coat material when printed over an underlying reference layer using a 13.5 BCM (billion cubic microns per square inch) anilox roller in conjunction with a 55 durometer rubber transfer roller on a Harper QD drawdown table at speed 8 does not change the signature intensity at wavelength 610 nm by more than 70% (which may be an increase or decrease) of the absolute relative intensity, preferably no more than 50% as compared to an identical sample that does not include the topcoat when using a Stellarnet Black Comet brand spectrometer-50 nm slit width and interrogating the sample with a reverse reflectance probe in contact with the sample at 45 degrees under LED illumination having a peak whose maximum is in the range from 400 to 700 nm.

Examples of coatings suitable to form release layer 94 are commercially available from a variety of commercial sources. Examples of such commercially available materials include, for example a coating available as FWPL08-252F from Futura. Other coatings available from Actega include HTL011331 and HTL001263. In some instances, the materials used to form topcoat layer are referred to in the printing industry as overprint varnishes with non-stick or anti-blocking characteristics.

In the embodiment shown in FIGS. **4*a* and 4*b*, taggant system 22 is incorporated into one or more printed, spectral ink layers 86 and 88 formed on release layer 94, if present, or formed on carrier sheet 14 if the release layer 94 is not present. For purposes of illustration, first taggant 24 of taggant system 22 is incorporated into first taggant layer 86 and second taggant 26 of taggant system 22 is incorporated into second taggant layer 88. In other modes of practice, spectral ink layers 88 and 86 are omitted, while taggants 24 and/or 26 are incorporated into the release layer 94**, which then further serves as a spectral ink layer as well as a release layer.

A wide variety of different taggants can be used in taggant system 22 as taggants 24 or 26 as well as additional taggants, if any, in the practice of the present invention. Illustrative taggants include luminescent compounds, IR absorbing compounds, combinations of these, and the like. Suitable luminescent taggants generally absorb incident light of suitable wavelength characteristics, experience photoexcitation, and then re-emit light as they relax to a stable ground state. Hence, luminescent light emission is different from incident light that is merely reflected or transmitted. Often, a luminescent compound absorbs light of certain wavelength(s) and re-emits light of a longer wavelength (down conversion). Some luminescent compounds may absorb light of certain wavelength(s) and re-emit light of a shorter wavelength (up conversion), however.

Luminescent compounds include phosphors (up and/or down converting), fluorescent compounds (sometimes referred to as fluorophores or fluorochromes) and/or phosphorescent compounds. Fluorescent compounds are preferred. Without wishing to be bound, it is believed that fluorescence results from an allowed radiative transition from a first excited singlet state to a relaxed singlet state. Without wishing to be bound, it is believed that phosphorescence results from an intersystem crossing from an excited singlet state to an excited, spin-forbidden transition state (typically a triplet state) followed by an allowed radiative transition into a relaxed singlet state.

Luminescent compounds useful in the practice of the present invention may be inorganic or organic. Fluorescent compounds in the form of organic dyes are particularly preferred, as these tend to be more soluble in ink to provide the resultant spectral inks and thus are more compatible with respect to inkjet printing, gravure printing, screen printing, flexographic printing, curtain coating, spin coating, and the like as compared to insoluble or partially soluble taggants that must be dispersed in an ink to be printed. Hence, each of compounds 24 or 26 may independently include at least one fluorescent compound and/or at least one phosphorescent compound, but preferably comprises a fluorescent compound, and more preferably comprises an organic fluorescent dye.

Taggants 24 and 26, and/or other taggants that might be used, may interact according to fluorescence resonance energy transfer (FRET). FRET refers to a mechanism involving energy transfer between luminescent molecules. In practical effect, FRET occurs in a sequence where an illumination initially triggers a promotion to an excited state by a first, or donor molecule. The energy absorbed by the donor molecule may be transferred through nonradiative processes and trigger a further fluorescent emission by a second, or acceptor fluorescent compound.

An optical brightener is one kind of luminescent compound that has been incorporated into label ink(s) to help make label features look visibly whiter and brighter to a user. One or more optical brightener compounds also are useful as taggant compounds in the practice of the present invention. An optical brightener typically absorbs ultraviolet or violet light and then re-emits light including emissions in the blue region of the electromagnetic spectrum (e.g., about 450 nm to about 500 nm). The practice of the present invention appreciates that the optical properties (e.g., fluorescent properties) of one or more optical brightener compounds can be used to encode all or a portion of a spectral code. Accordingly, taggant system 22 may include at least one optical brightener compound. One or both of taggants 24 or 26 may be an optical brightener compound. Alternatively, one or more optical brightener compounds may be included in taggant system 22 in addition to taggants 24 and 26. Optical brighteners can be incorporated into other layers of transferable image 16 and need not be placed in the same layer(s) as taggant compounds 24 and 26. For example, one or more optical brighteners could be incorporated into the release layer 94 and/or the base color layer(s) 90.

In preferred modes of practice, optical brightener compounds suitable for use in taggant system 22 are luminescent compounds that emit a luminescent response including blue light having at least one emission peak in the range from 450 nm to 500 nm in response to ultraviolet or violet illumination. A preferred illumination to trigger such a response is ultraviolet or violet LED illumination having an emission peak in the wavelength range from 200 nm to 420 nm.

In the practice of the present invention, ultraviolet light is light that has one or more wavelength peaks in the range from 100 nm to 400 nm. Violet light is light having one or more wavelength peaks in the range from greater than 400 nm to 420 nm. Blue light refers to light having one or more wavelength peaks in the range from 420 nm to 500 nm. Infrared light is light having one or more wavelength peaks in the range from 700 nm to greater than 1200 nm.

As between using illumination in the ultraviolet range or the violet range to trigger a fluorescent response in an optical brightener compound, ultraviolet light is preferred. The reason is that ultraviolet light has less potential to overlap and wash out the blue light fluorescently emitted by an optical brightener compound as compared to using violet illumination. As a practical matter, this means that using ultraviolet illumination to trigger the luminescent signature response of an optical brightener compound makes the emitted signature easier to detect and resolve without interference from the illuminating light.

In particular, the spectrum of ultraviolet or violet LED illumination, for example, may be used to illuminate an optical brightener in spectral code strategies, because such illumination is shifted away from the blue light and higher (if any) wavelength emissions of the optical brightener. Consequently, the spectral code features of the optical brightener in the blue light and longer wavelength regimes can easily be detected while those of the LED illumination can be blocked from reaching the detector by an appropriate optical filter. In the cause of using ultraviolet LED illumination with a peak intensity at 385 nm, for example, the corresponding detector may be fitted with an optical filter over the detector(s) to block out at least a portion of the illumination wavelengths, e.g., wavelengths below about 400 nm, or even below about 430 nm, from reaching the detector(s). In one aspect, therefore, the present invention appreciates that the luminescent emissions of optical brightener compounds in the blue light regime from about 420 nm to about 500 nm incorporate useful spectral code features.

Examples of fluorescent compounds suitable for use as compounds 24 and/or 26 are described in U.S. Pat. Nos. 8,034,436; 5,710,197; 4,005,111; 7,497,972; 5,674,622; and 3,904,642.

Examples of phosphorescent compounds for use as compounds 24 and/or 26 are described in U.S. Pat. Nos. 7,547,894; 6,375,864; 6,676,852; 4,089,995; and U.S. Pat. Pub. No. 2013/0153118.

Examples of optical brightener compounds are described in U.S. Pat. Nos. 6,165,384; 8,828,271; 5,135,569; 9,162,513; and 6,632,783.

Examples of infrared absorbing compounds are described in U.S. Pat. Nos. 6,492,093; 7,122,076; 5,380,695; and Korea patent documents KR101411063; and KR101038035.

Examples of up and down converting phosphors are described in U.S. Pat. Nos. 8,822,954; 6,861,012; 6,483,576; 6,813,011; 7,531,108; and 6,153,123. Phosphors often provide a spectral response to illumination that is time dependent. That is, S=I(t), where S is the spectral response and I(t) is an intensity function that varies with time. Typically, the response starts out at an initial intensity and then decays over a characteristic time period associated with a particular phosphor compound. The decay often is nonlinear. Consistent printing of all spectral inks is important to provide a uniform signature, but is particularly important so that the function I(t) is consistent. Centralized creating of the heat transfer devices 12 and the transfer images 16 is important in order to help ensure that print quality for phosphor taggants and other taggants is consistent. The present invention appreciates that only after the critical signature features are printed under consistent practices is the transfer image 16 thereafter transferred to other surfaces. Centralized printing of the images 16 to ensure consistent printing could be undermined if the resultant images were vulnerable to signature changes caused by transfer or as a result of transfer. By incorporating metal foil features into the transfer images 16 according to the present invention, the impact of the transfer upon the signature is negated as a practical matter.

Still referring to FIGS. **4*a* and 4*b*, one or more base color layers 90 are formed on the taggant layers 86 and 88. For purposes of illustration, a single base color layer 90 is shown. Base color layer 90 helps to provide a solid background against which the spectral code incorporated into the taggant layers 86 and 88 can be read. The solid background helps to allow a better, stronger spectral response 64 to be harvested from illuminating transferred image 32 with illumination 28. In many embodiments, base color layer 90 is a single, neutral color such as an opaque white or grey, but it can be formed from one or more other printed colors, if desired. Opaque white embodiments of layer 90 are more preferred for generating higher intensity spectral responses 64**.

Even though appearing opaque to the unaided human eye, a solid base color layer 90 still may be allow backlighting to pass through the label when, for example, the substrate is a strong color and or transparent or translucent, luminescent, or otherwise illuminated. The metal foil material used in the practice of the present invention may be buried underneath the base color layer 90 and not visible to a user or partially exposed through one or more windows (not shown) in base color layer 90, but the presence of the foil significantly increases the opacity of the transferred image so that back-lighting or other substrate effects do not unduly interfere with emission of the proper signature. Yet, the foil layer in preferred embodiments, particularly when formed using metal vapor deposition or sputtering techniques is so thin as to have de minimis impact upon the overall thickness of the transferred image. The resultant transferred image appears generally to have been printed in situ rather than, as is the actual case, having been formed on another carrier and transferred onto the labeled surface.

Adhesive layer 92 is provided on base color layer 90. Adhesive layer 92 helps to adhere metal foil layer 96 onto the base color layer 90. A wide range of adhesive materials can be used singly or in combination to form adhesive layer 92. Pressure sensitive adhesives, hot melt, ultraviolet curable adhesives, solvent or the like are most preferred.

Metal foil layer 96 desirably includes one or more metallic layers. These may be provided in a variety of ways, but desirably are deposited using vapor deposition techniques. Vapor deposition may occur by physical vapor deposition or chemical vapor deposition. For purposes of the invention, sputtered films are also considered to be vapor deposited. Metal foil layers may be deposited onto carrier 14 or formed on a separate carrier and then transferred onto carrier 14. Embodiments including a combination of a metal foil layer 96 and adhesive layer 92 supported on a separate carrier can be procured from a variety of commercial sources. The metal foil layer 96 and the adhesive layer 92 would then be transferred onto the base color layer 90 using a suitable transfer technique.

Vapor deposited layers can be provided in embodiments that are very thin, e.g., from about 0.5 microns to about 20 microns, and yet are highly opaque. The thin dimensions and optical opacity provide many advantages in a transferred image incorporating one or more spectral codes. For example, even though base color layer 90 may be one or more solid, opaque printed colors, the color or degree of light transparency of the underlying, labeled substrate could unduly influence reading the spectral code. As one drawback, the influence of the optical characteristics of the label material, color or substrate/product upon the spectral reading may require using that a detector with less strict reading tolerances.

The influence of the label material and color, as well as the substrate color and opacity upon spectral readings was investigated by studying how the presence of a metal foil layer improved the opacity of transferred images and allowed spectral readings to be more uniform when read from different kinds of substrates. According to a test protocol to evaluate opacity, heat transfer images were placed over the black and white portions of a LENETA Form 2A Opacity Chart. Readings were then taken of the transfer over both the white and black portions using an XRite Ci64 UV unit. The difference between the lightness values of the readings were then used to determine the relative opacity of each image transfer. The higher the opacity reading, the better the thermal transfer is at blocking background interference resulting in more uniform readings of the taggant signature.

In the absence of a metal foil layer, images formed from 1 layer of opaque white ink were found to be about 63 percent opaque. Images formed from 1 layer of the opaque white ink without a metal foil layer were found to be quite visually different when printed onto bright white substrates as compared to black substrates. Unfortunately, this makes the reading more vulnerable to false positives, counterfeiting, or the like. Conventionally, such drawbacks could be avoided by custom programming a detector for each label material and color in order to implement tight spectral code tolerances, but this is time consuming and expensive. In addition, this still does not address the influence of the opacity and color of the substrate or product to which the label is ultimately applied.

In contrast, when otherwise similar layers of opaque white ink were printed onto 1 or 2 underlying layers of silver or gold cold foils, the opacity increased to over 98 percent for each sample. The metal foil-containing images looked visually identical when transferred onto white or black substrates. The conclusion is that the presence of the metal foil layer(s) makes the image significantly more opaque. Advantageously therefore, the metal foil layer(s) dramatically reduce the impact of both the label and substrate/product upon the spectral reading. A key advantage is that this allows detectors to be programmed with stricter tolerances since the impact of both the label and substrate/product upon the detector reading is rendered de minimis. In other words, the foil material makes the spectral response of the images more substrate independent and therefore more universal.

Just as was the case for the release layer 94, the metal foil layer 96 may be continuous layer onto which other layers of image 16 are formed in selected regions. Alternatively, the foil layer 96 may be applied only in selected regions corresponding to the images 16. When images 16 are transferred to another substrate, the foil can also be selectively transferred in the area of heat and/or pressure. The transferred foil regions may have a footprint larger than the overlying base color layer 90 so that the entirety of the base color layer 90 and overlying spectral ink layers 86 and 88 are backed up by the opacity of the metal foil layer 96. Boundary portions of the foil layer 96, therefore, would be viewable outside the footprint of the base color layer 90 and the spectral ink layers 86 and 88. In other modes of practice, some interior portions of the metal foil may be exposed through the base color layer 90 so that spectral inks in layers 86 and 88 provided over the exposed regions will provide different signature details than over the base color regions.

Metal foil layer(s) 96 may include a wide variety of one or metal materials including metals, metal alloys, intermetallic compositions, and the like. Examples of metallic materials include aluminum, gold, silver, platinum, copper, brass, bronze, combinations of these, and the like. When longer service life is desired, metals that are vulnerable to undue degrees of color changes over time (e.g., copper can oxidize and turn green) desirably are avoided, as such changes could impact the ability to spectral read the labels under tight tolerances. On the other hand, when it is desired that a signature only be readable for a limited time period, such as to avoid improper reading attempts after initial use), using foil materials that change more quickly, e.g., copper, would be useful.

In the printing industry, the metal foil layer(s) 96 may be provided using techniques such as cold foil printing. Sometimes, cold foil printing may, be referred to as foil printing. Such printing techniques are known to be fast, accurate, and cost-effective. In a typical process, a metal foil layer is vapor deposited onto a separate carrier sheet and then transferred and laminated into the desired images 16. Other techniques may be used if desired, such as hot foil techniques. Metal foil products are commercially available and may be used with features that enhance the performance of the foil, particularly if the metal foil is viewable in case base color layer 90 is not present or has window(s) through which the foil material is exposed. As one example, foils may be formed in a manner such that the foil has a silver or pewter appearance. Tints may be applied to make the foil look other colors, more glossy, less glossy, or the like. In some instances, the foil may incorporate holographic effects.

Hot melt adhesive layer 97 is provided on the metal foil layer. Advantageously, the hot melt adhesive is non-tacky at room temperature. Some embodiments also may exhibit anti-blocking characteristics at room temperature. However, under heat and pressure, hot melt adhesive layer 97 can be used to form a strong bond to the desired label/substrate site after the melted adhesive cools and solidifies. Hot melt adhesives may be thermoplastic or thermosetting as they cure. Such adhesives may chemically and/or physically bond to the label or substrate when cured.

Figure 5A:
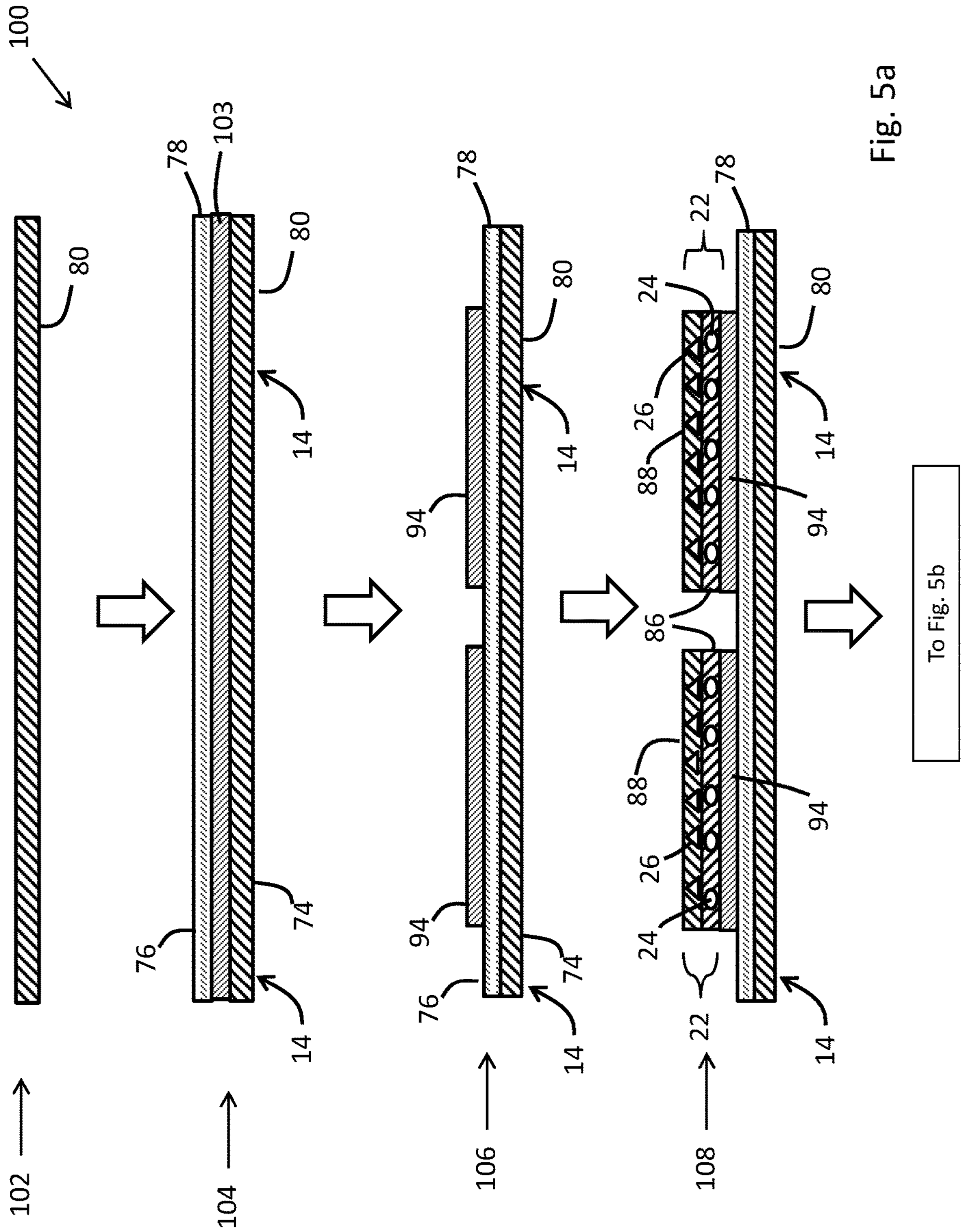
FIG. 5*a* schematically shows a portion of an illustrative method that may be used to form the heat transfer device of FIG. 1.
Figure 5B:
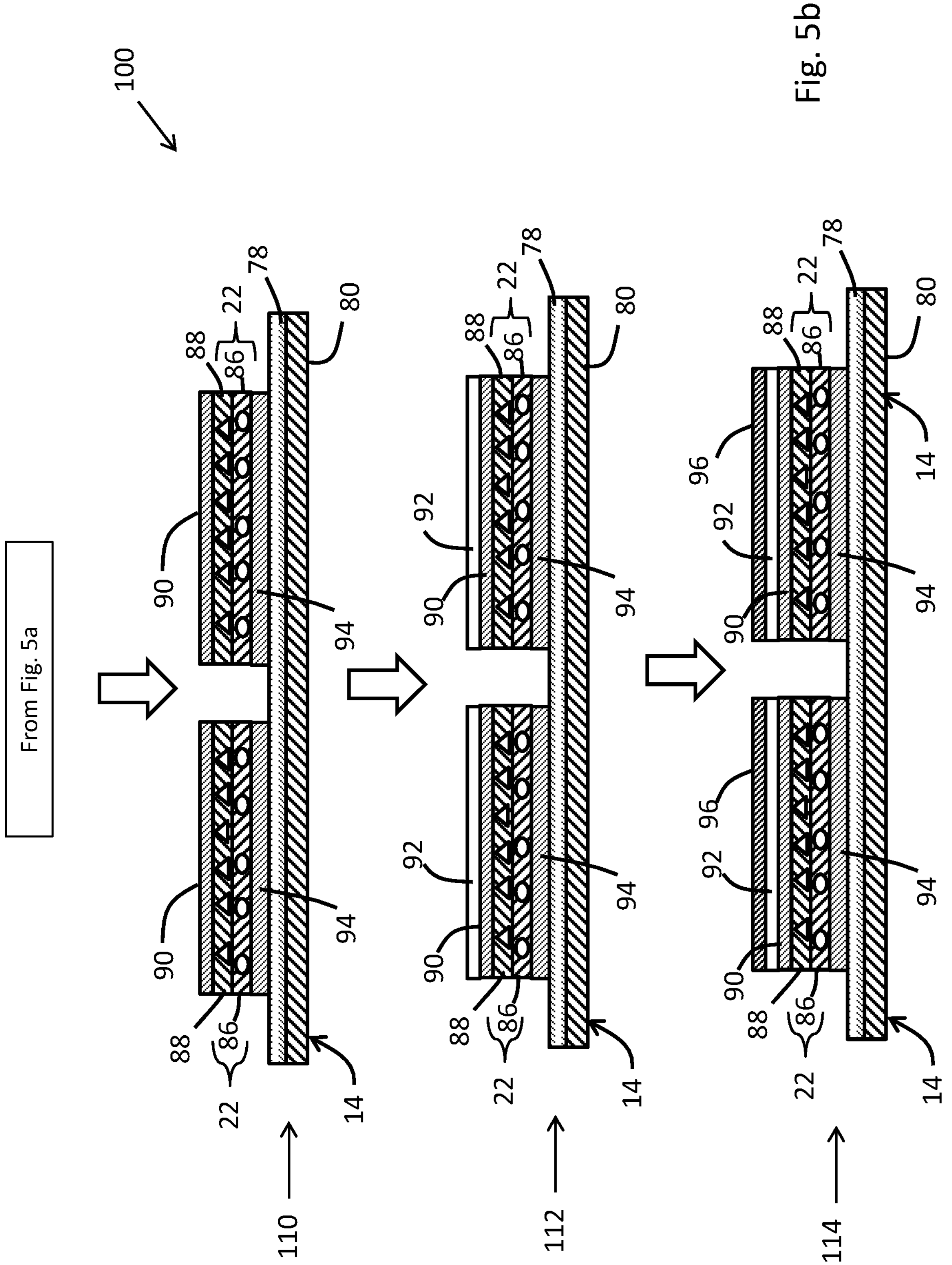
FIG. 5*b* shows a further portion of the method shown in FIG. 4*a*.
Figure 5C:
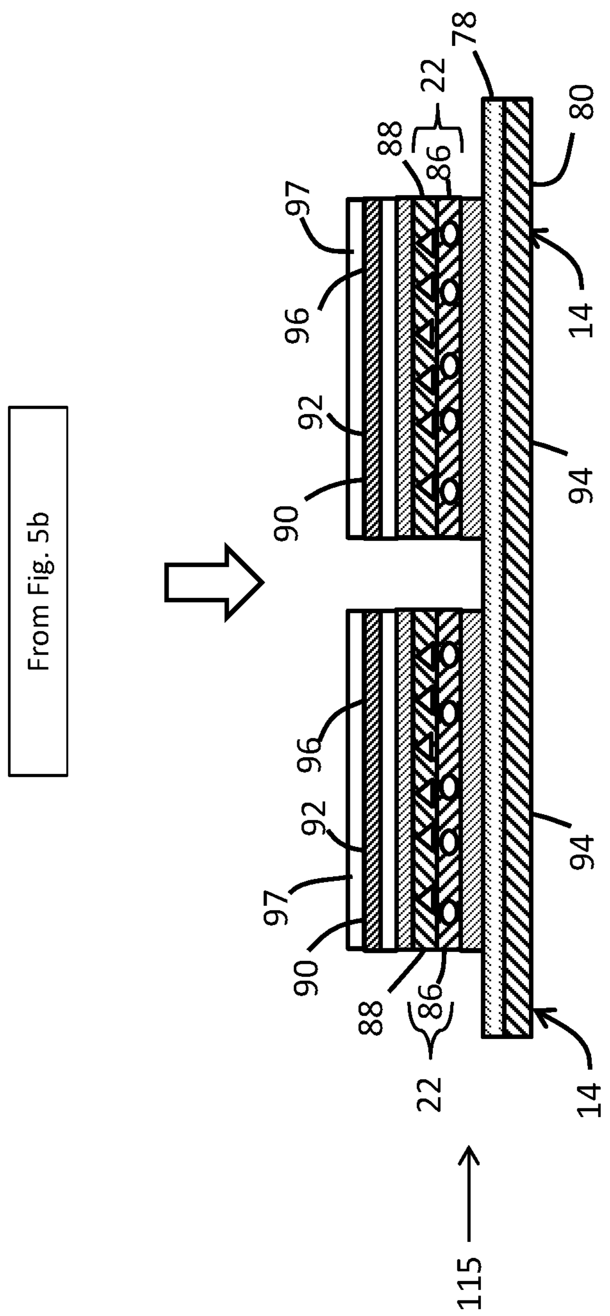
FIG. 5*c* shows a further portion of the method shown in FIG. 4*a*.

FIGS. 5*a*, 5*b* and 5*c* schematically illustrate one method 100 for forming transfer image 12. For purposes of illustration, only a portion of device 12 is shown that includes forming two heat transfer images 16 on common carrier 14. In actual practice, an array of heat transfer images 16 could be formed on carrier 14 as is illustrated with respect to the supply roll 18 as shown in FIG. 2. The supply roll embodiment of FIG. 2 is useful in commercial production operations in order to fabricate a large number of spectrally coded labels 34 from precursor materials including the supply roll 18 and labels 16. In other modes of practice, a single heat transfer image 16 is formed on a carrier 14. This would be useful in custom applications where only a single, spectrally responsive label 34 is needed at the time.

Method 100 shows how heat transfer image 16 is built upside down on carrier 14. The construction is upside down in the sense that the orientation of image 16 is reversed when affixed to a target site on a label. In other words, the bottom-most release layer 94 formed first becomes the uppermost layer of the corresponding transferred image 32. Similarly, the uppermost hot melt adhesive layer 97 becomes the bottom-most layer of the corresponding transferred image 32.

In step 102, base sheet 80 of carrier 14 is provided. In step 104, release layer 78 of carrier 14 is formed on base sheet 80. Note that a carrier 14 may be commercially procured in which release layer 78 already has been provided on base sheet 80. An optional primer layer 103 (shown only in FIG. 5*a* with respect to step 104) may be used to help adhere release layer 78 to base sheet 80. As a further option, the face of base sheet 80 that bonds to the release layer 78 may be primed or surface treated, such as by exposure to a suitable fluence of ultraviolet light, e-beam irradiation, corona discharge, or the like, in order to help promote better adhesion to the release layer 78. In some modes of practice, primer layer 103 and a surface treatment of base sheet 80 may be used in combination. Note that the carrier 14 conveniently may be procured as a product in which the release layer 78 is already formed on the base sheet 80. If carrier 14 is commercially procured, it may be desirable to prime or surface treat the release layer 78 to assist forming images 16 on the carrier 14.

In step 106, release layer 94 is formed on release layer 78. Next in step 108, the one or more taggant layers (layers 86 and 88 in this embodiment including taggants 24 and 26, respectively) are formed on the release layer 78. In step 110, the base color layer(s) (for purposes of illustration, a single base color layer 90 is shown) are printed on the taggant layers. In step 112, adhesive layer 92 is printed on the base color layer 90. In step 114, the metal foil layer 96 is applied over the adhesive layer 92. In step 115, the hot melt adhesive layer 97 is applied.

The various layers formed on carrier 14 in the course of carrying out method 100 may be formed using any of a variety of coating or printing or lamination techniques such as flexographic printing, screen printing, rotary letter press, gravure printing, inkjet printing, curtain coating, spray coating, and the like.

The background underlying the spectral ink layers 86 and 88 tends to impact the spectral signature. In many instances, the background influences the intensity of the signature. This behavior may be used to make signature codes that are more complex by printing the spectral inks of layers 86 and/or 88 over different backgrounds. For example, base color layer 90 may be formed from different colored regions. With sufficient color contrast among regions, the spectral responses of the taggant compounds 24 and 26 in a region would be detectably different from that of another region. Each colored region thus presents unique code information even if the taggant compounds 24 and 26 are the same. Alternatively, a base color layer 90 may be printed so that one or more regions of the underlying metal foil layer 96 are viewable in the transferred image 16. When the taggant layers 86 and 88 are printed over both the base color layer 90 and the exposed metal foil regions, each such region would provide different spectral code information. In other words, the spectral inks printed over the base color 90 would provide different spectral code information than the same inks printed over the exposed metal foil regions. Of course, different spectral inks with different taggant compounds could be spot printed over the different regions.

Figure 4C:
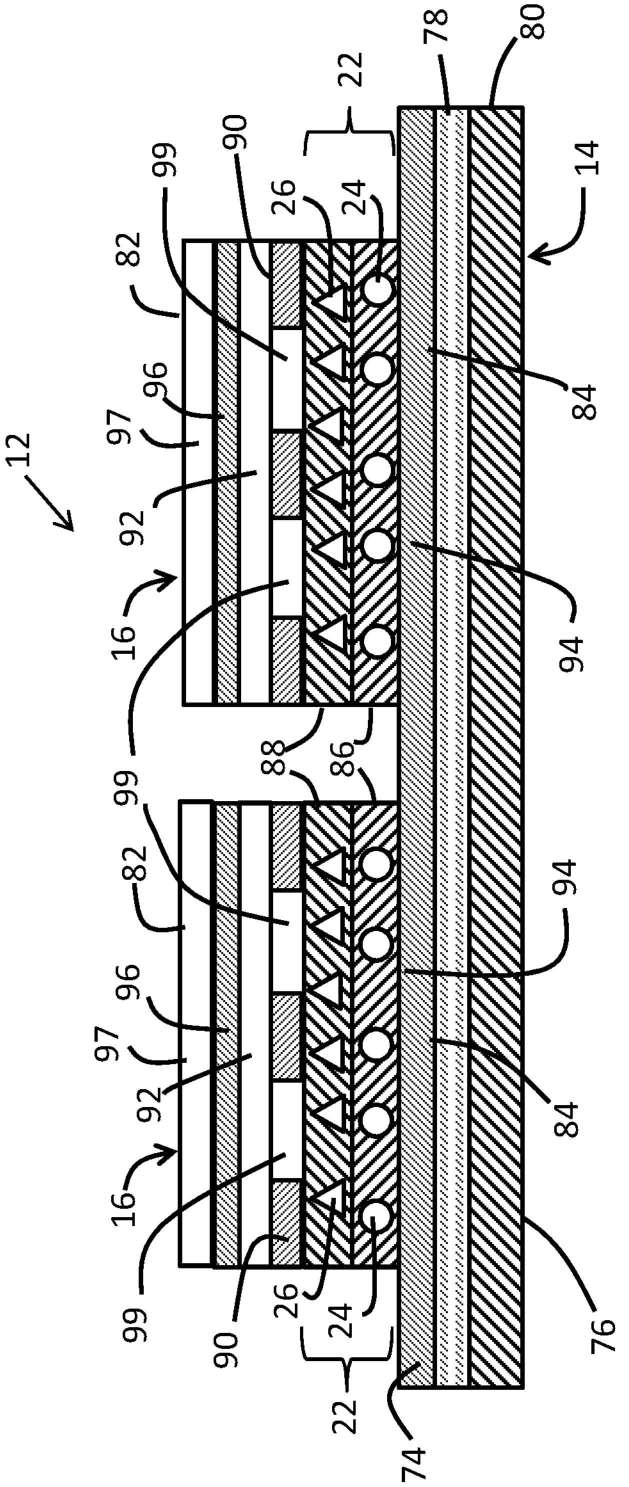
FIG. 4*c* shows a modification of the heat transfer device of FIG. 4*a*, wherein the base color layer is discontinuous to expose regions in the metal foil layer upon transfer of the heat transfer image to a substrate.

FIG. 4*c* shows an embodiment in which the base color layer 90 is discontinuous such that some underlying regions 99 of metal foil layer 96 would be viewable after image 16 is transferred.

Figure 7:
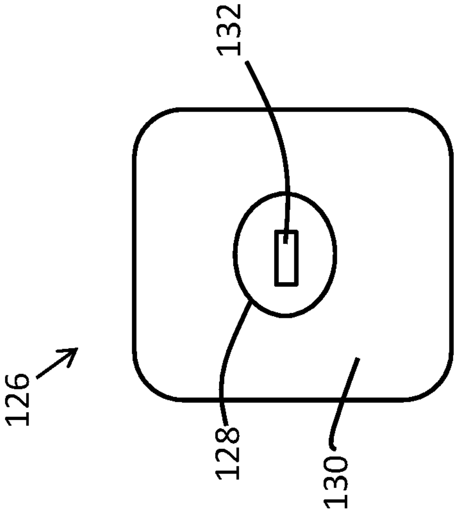
FIG. 7 is a schematic top view of an alternative embodiment of a heat transfer device of the present invention.
Figure 6:
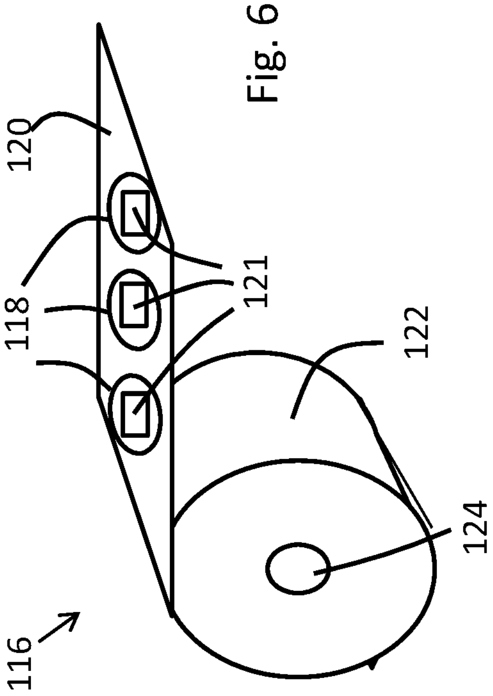
FIG. 6 is a schematic perspective view of an alternative embodiment of a heat transfer device of the present invention.

FIGS. 6 and 7 show alternative embodiments of transfer devices of the present invention. FIG. 6 shows heat transfer device 116 including a single row of heat transfer images 118 supported on a carrier 120. Each image 118 incorporates taggant system 121. The device is stored in the form of a supply roll 122 on spool 124. FIG. 7 shows a heat transfer device 126 including a single heat transfer image 128 supported on carrier 130. Heat transfer image 128 incorporates taggant system 132.

Figure 9:
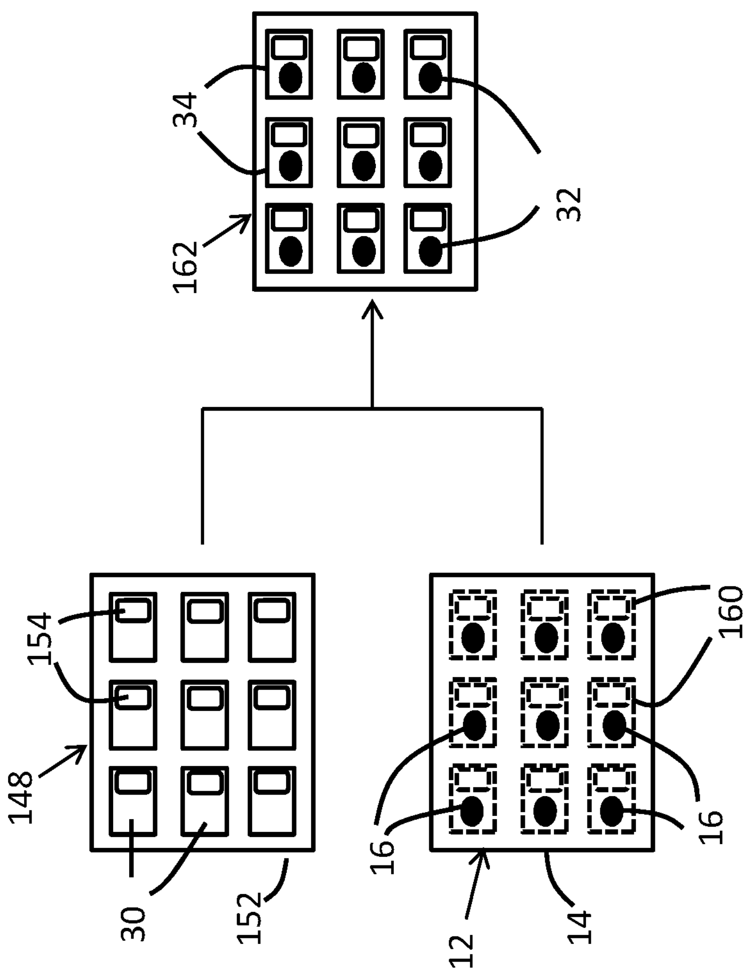
FIG. 9 schematically shows how the method of FIG. 6 is used to form labels that incorporate a spectral code.
Figure 8:
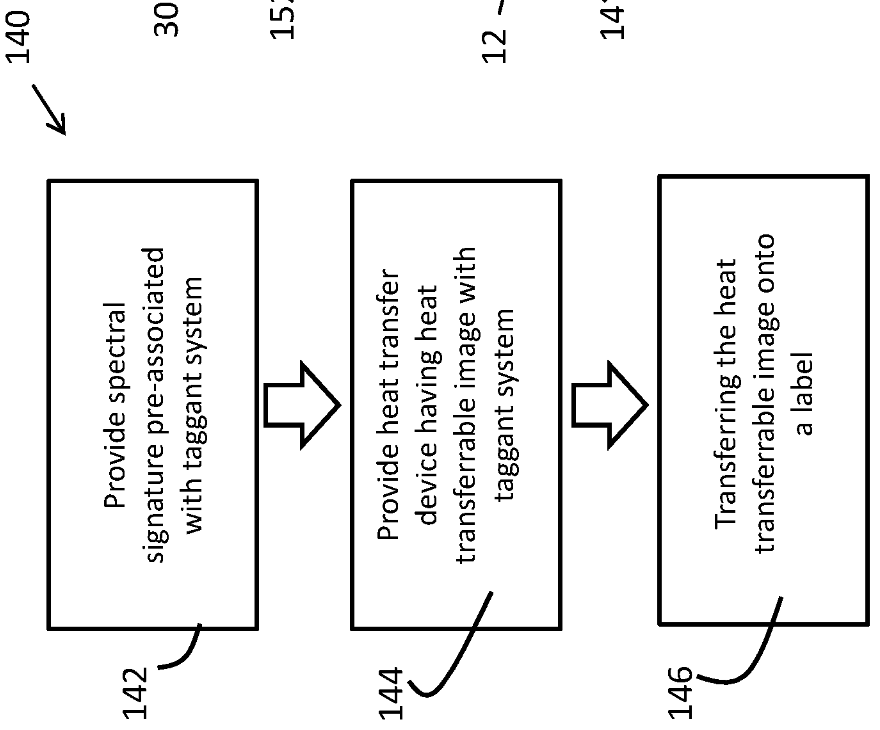
FIG. 8 schematically shows a method that uses the heat transfer device of FIG. 1 to make labels that incorporate a spectral code.

FIGS. 8 and 9 schematically shows an illustrative method 140 that is useful for using heat transfer device 12 and an array 148 of labels 30 to make an array 162 of spectrally coded labels 34. In step 142, a spectral code that is pre-associated with taggant system 22 is provided. As described above with respect to FIG. 1, illumination of taggant system 22 with illumination 28 causes the taggant system to emit spectral response 64 that encodes at least a portion of the pre-associated spectral code. Each label 30 includes visually observable information 154 such as text information, graphic information, bar code information, and the like.

In step 144, heat transfer device 12 is provided. As shown in FIG. 9, heat transfer images 16 are releasably supported on the carrier 14. Heat transfer images 16 are positioned in register on carrier 14 in order to properly register with a corresponding target site on a corresponding label 30 when the heat transfer device 12 and the label array 148 are brought into face to face contact effective to transfer the images 16 from carrier 14 onto the corresponding labels 30. The registrable positioning of heat transfer images 16 on carrier 14 is schematically shown by the registration footprint 160 showing how the labels 30 would register with the images 16 during heat transfer operations. Labels 30 are supported on carrier 152. Labels 30 include visually observable information 154 such as bar codes, graphics, text information, or the like.

In step 146, the heat transfer images 16 are transferred to target sites on corresponding labels 30 in order to provide the resultant array 162 of spectrally coded labels 34 containing the transferred images 32. Optionally, a protective topcoat layer may be provided over the transferred images and even over the entirety of the labels bearing the transferred images and optionally other indicia.

Figure 10:
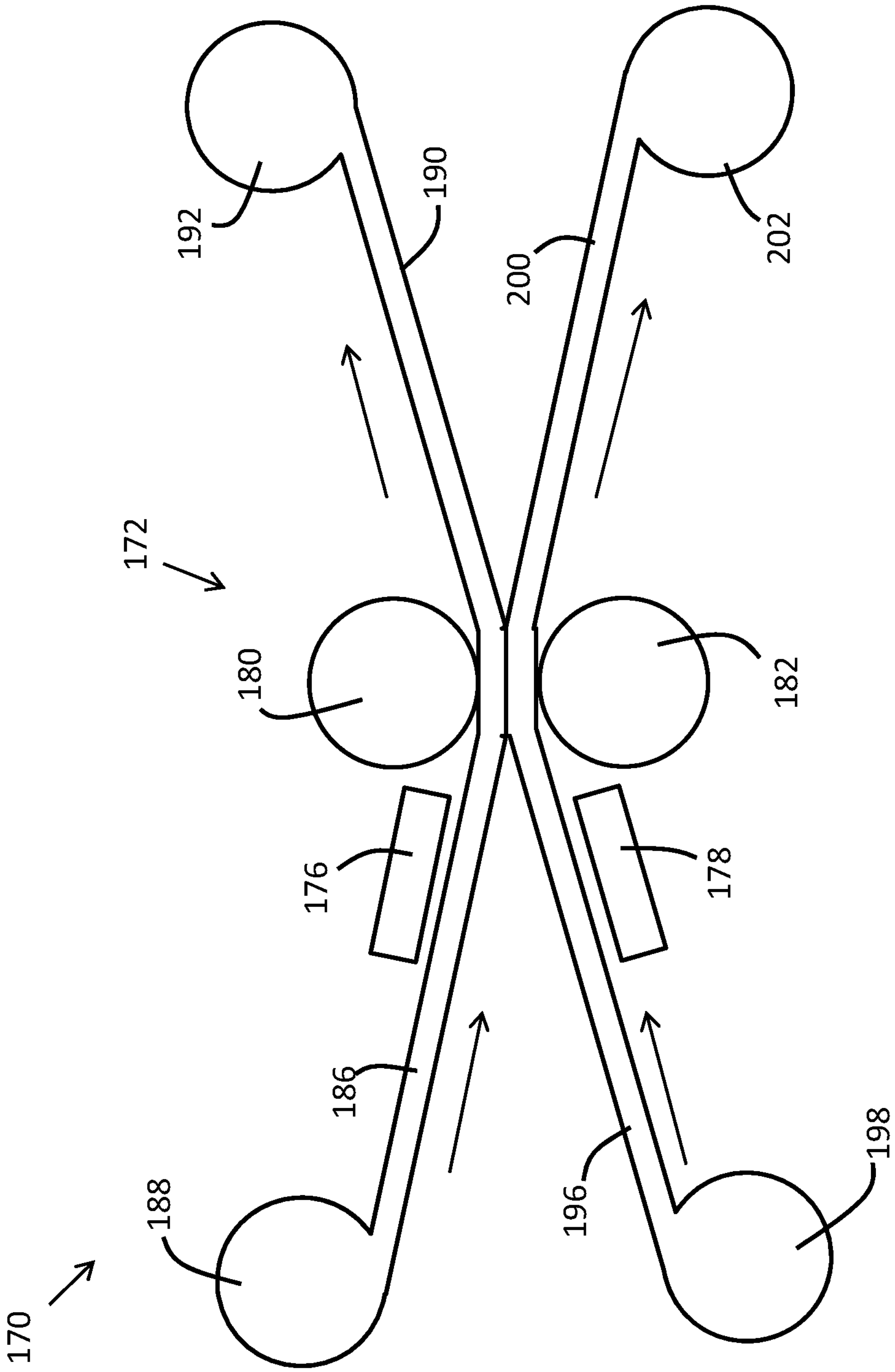
FIG. 10 schematically shows an illustrative manufacturing station that can be used to practice the method illustrated in FIGS. 6 and 7.

FIG. 10 schematically shows an illustrative system 170 useful for carrying out step 146 of method 140 shown in FIGS. 8 and 9. System 170 includes image transfer station 172. Station 172 includes heaters 176 and 178 and pressure rollers 180 and 182. On the inlet side of station 172, a web 186 of labels 30 (FIG. 9) from supply roll 188 is fed into station 172. A web 196 of heat transfer images 16 (FIG. 9) from supply roll 198 also is fed into station 172. While out of contact, webs 186 and 196 are heated by heaters 176 and 178, respectively. Heating labels 30 on web 186 makes the labels more receptive to receiving the heat transferable images 16 on web 196. Heating the heat transferable images 16 on web 196 both heats and softens the interface between the heat transfer labels and their carrier, allowing them to be more easily and cleanly released. Also, the hot melt adhesive on the exposed face of the heat transfer images 16 is sufficiently heated and softened to be adhesively activated.

Webs 186 and 196 are fed between pressure rollers 180 and 182 in registrable contact so that heat transfer images 16 (FIG. 9) on web 196 are transferred in register to corresponding labels 30 (FIG. 9) on web 186. Pressure and heat provided by rollers 180 and 182 help to accomplish the image transfer. Web 190 of the resultant spectrally coded labels 34 (FIG. 9) exits station 172 and is stored on take up roll 192. The empty web 200 also exits station 172 and is stored on take up roll 202 for recycling, or empty web 200 may be discarded.

Figure 11:
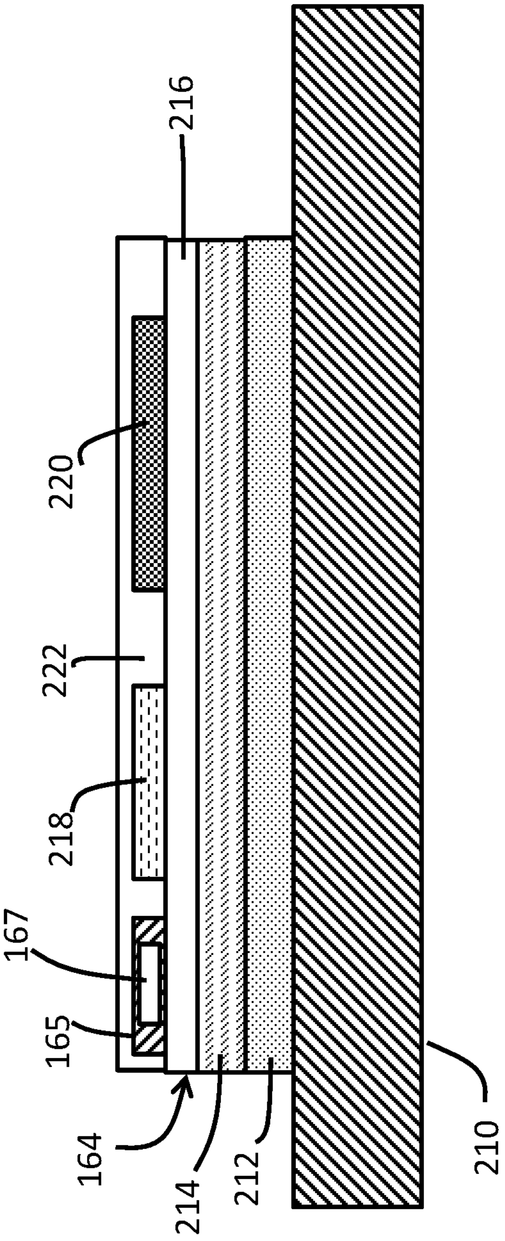
FIG. 11 schematically shows a side cross section of an illustrative label of the present invention that may be removed from a carrier and then adhesively attached to a desired substrate.

FIG. 11 schematically illustrates how an illustrative spectrally coded label 164 can be used to label a substrate 210 with a spectral code and other label indicia. Label 164 includes an adhesive layer 212 that adheres label 164 to the substrate 210. A base sheet 214 is provided on adhesive layer 212 at least in part to help provide structure support for label 164. One or more base color layers 216 are provided on base sheet 214. Heat transferred image 165 is provided on the base color layer(s) 216. Image 165 includes taggant system 167. Additional label indicia also are provided on the base color layer(s) 216. For example, graphic indicia 218 may include graphic images, bar codes, or the like. Text information 220 also may be included. A protective topcoat layer 222 also is provided.

Figure 12:
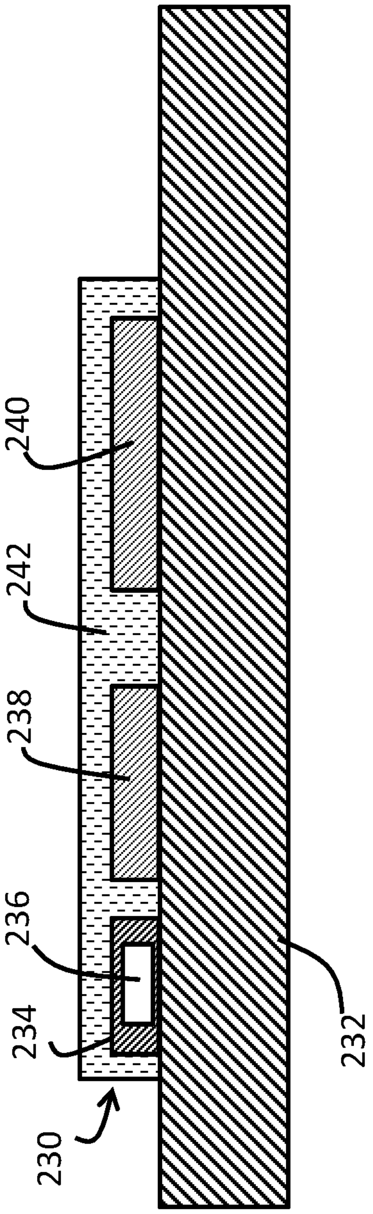
FIG. 12 schematically shows a side cross section of an illustrative transfer label of the present invention including transferrable images that may be transferred to a desired substrate.

FIG. 12 schematically illustrates an alternative heat transferred embodiment of a spectrally coded label 230 affixed to a substrate 232 using heat transfer techniques. Label 230 includes heat transferred image 234 incorporating taggant system 236, heat transferred graphic information 238, and heat transferred text information 240. A protective topcoat 242 (sometimes referred to as an overprint varnish in the industry) is formed over image 234, graphic information 238, and text information 240.

Figure 13:
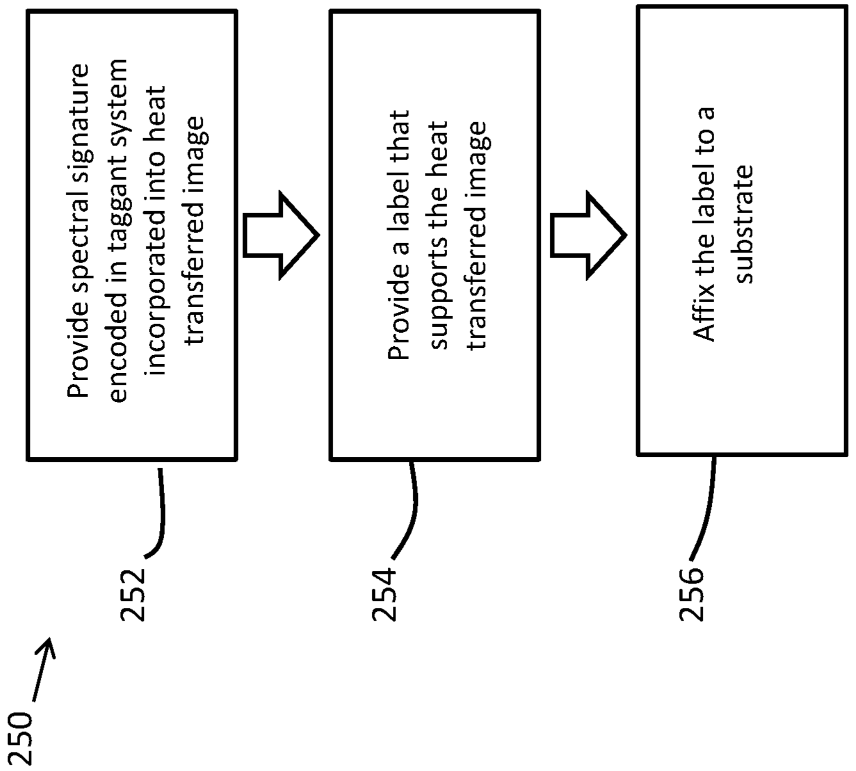
FIG. 13 schematically shows a method of using the label of FIG. 11.

FIG. 13 schematically illustrates one method 250 by which label 164 of FIG. 11 may be attached to substrate 210. In step 252, a spectral code is provided. The spectral code is pre-associated with taggant system 167 incorporated into the transferred image 165. Taggant system 167 incorporates one or more taggants that emit a spectral response 64 (FIG. 1) in response to illumination 28 (FIG. 1). The spectral response 64 encodes at least a portion of the spectral code. In step 254, label 164 is provided. As shown in FIG. 11, label 164 supports the heat transferred image 165 as well as graphic indicia 218 and text indicia 220. In step 256, the label 164 is affixed to substrate 210.

Figure 14:
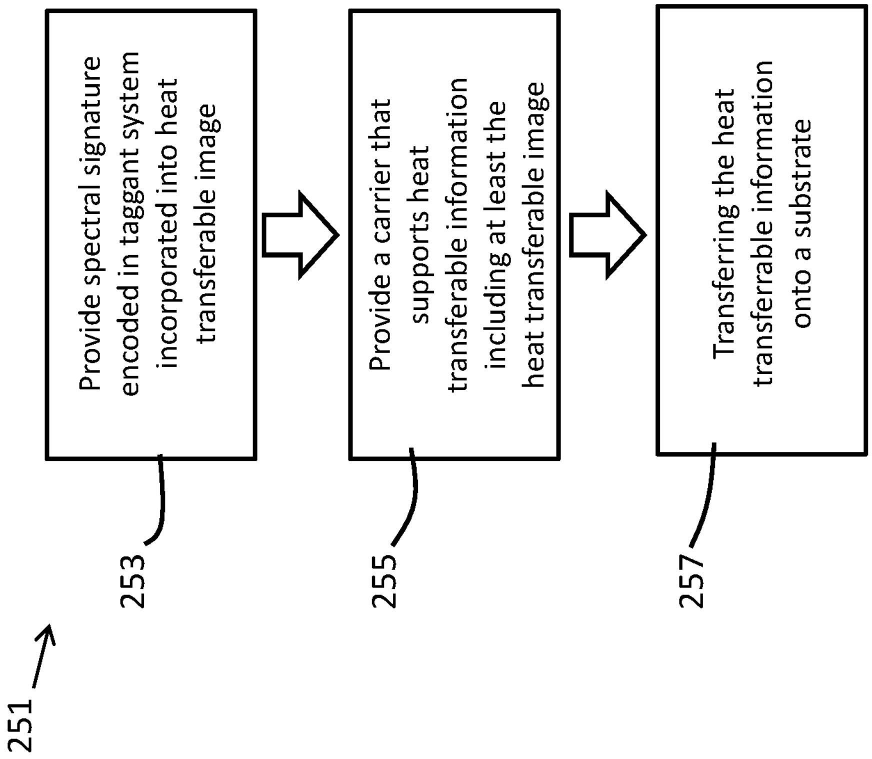
FIG. 14 schematically shows a method of using the label of FIG. 12.

FIG. 14 schematically illustrates one method 251 that uses heat transfer techniques to affix label 230 of FIG. 12 to substrate 232. In step 253, a spectral code is provided. The spectral code is pre-associated with taggant system 236 incorporated into the heat transferred image 234. Taggant system 236 incorporates one or more taggants that emit a spectral response 64 (FIG. 1) in response to illumination 28 (FIG. 1). The spectral response 64 encodes at least a portion of the spectral code. In step 255, a carrier supporting information including at least the image 234 (FIG. 1) in a heat transferrable configuration and optionally other heat transferrable indicia such as graphics, bar code information, text information, and the like, is provided. In step 257, the image 234 and other heat transferrable indicia, if any, supported on the carrier, are transferred to the substrate 232.

Figure 17:
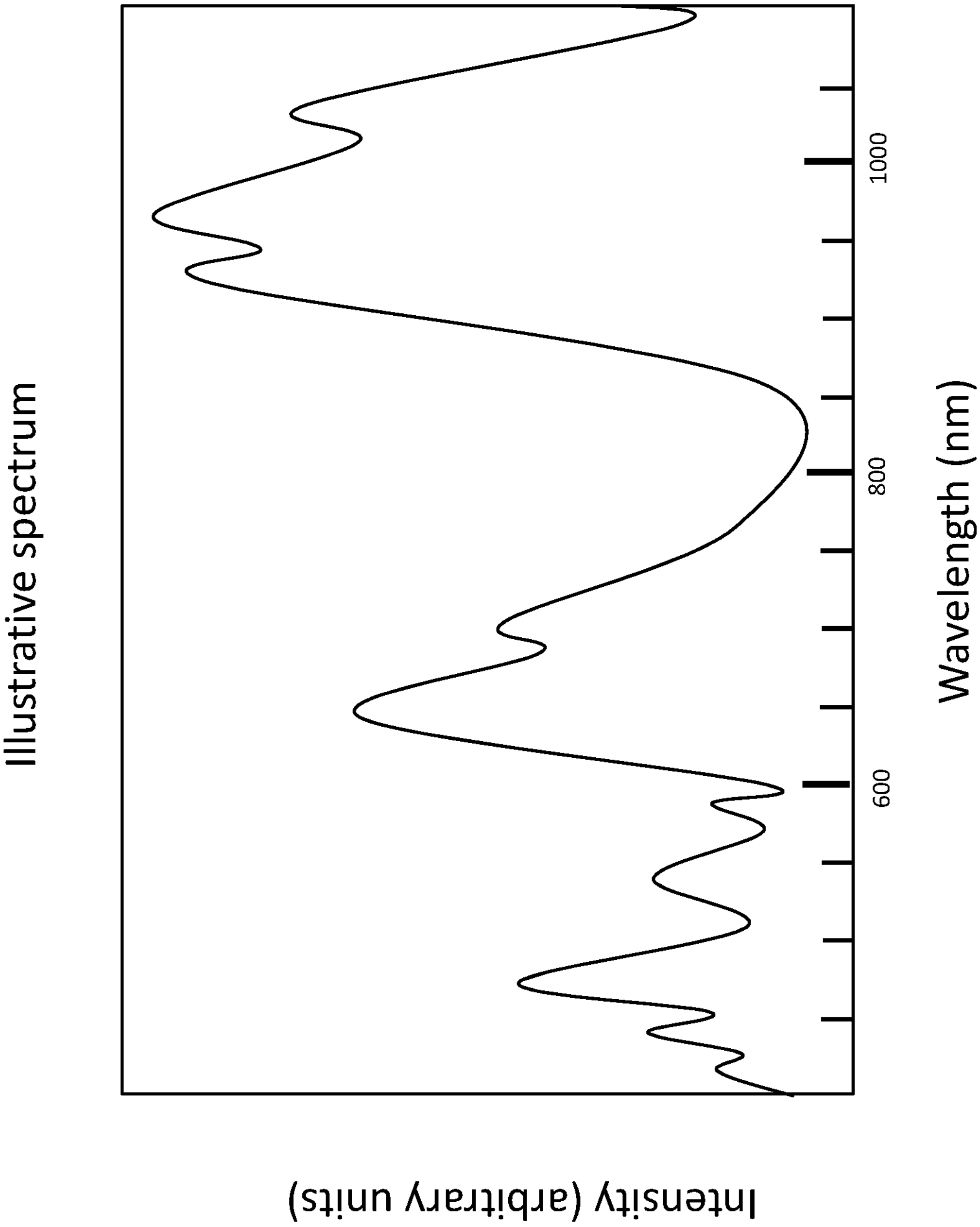
FIG. 17 schematically illustrates a spectrum emitted by an exemplary luminescent taggant compound, wherein intensity is plotted as a function of wavelength.

For purposes of illustration, FIG. 17 shows a spectral response associated with an exemplary luminescent taggant compound upon illumination by an illumination source. Different spectral responses may be obtained by illumination with other wavelengths. In other words, the same taggant compound will spectrally respond and uniquely with differently to different illumination wavelengths. In FIG. 17 the intensity of the spectral emissions of a luminescent compound are plotted as a function of wavelength. At each wavelength, the height of the curve indicates the intensity of detected light at that wavelength. Just as a fingerprint or signature of a person can be used to confirm the identity of that person, different luminescent taggant compounds exhibit spectral curves that are unique relative to the spectral responses of other luminescent taggant compounds. The unique character of a resultant spectral code means that a spectral code can serve as a fingerprint to help identify or authenticate a particular substrate. A typical spectral code resulting from composite characteristics of multiple spectra dependent on many factors.

For example, a spectral code desirably may result from a composite of features of multiple spectra of multiple taggants whose characteristics are impacted by factors including the kinds of taggant compounds, the ratios of the taggant compounds, how the compounds are incorporated into inks, how the inks are printed, and the like. A composite signature, therefore, is more complex and more unique to make it easier to distinguish, harder to reverse engineer, able to encode more information, and/or the like. Consequently, one or more spectral responses of one or more corresponding taggants can be integrated to provide a composite spectral code that can be used to help identify or authenticate a particular label to see if it includes a proper spectral signature. For purposes of illustration, embodiments of composite spectral codes are derived from the spectral responses of at least two taggants. Exemplary taggants include luminescent compounds, optical brightener compounds, IR absorbing compounds, and the like. The code provided by using a combination of compounds may be part of a library of different spectral codes that can be associated with different labels, and therefore different substrates.

Figure 18:
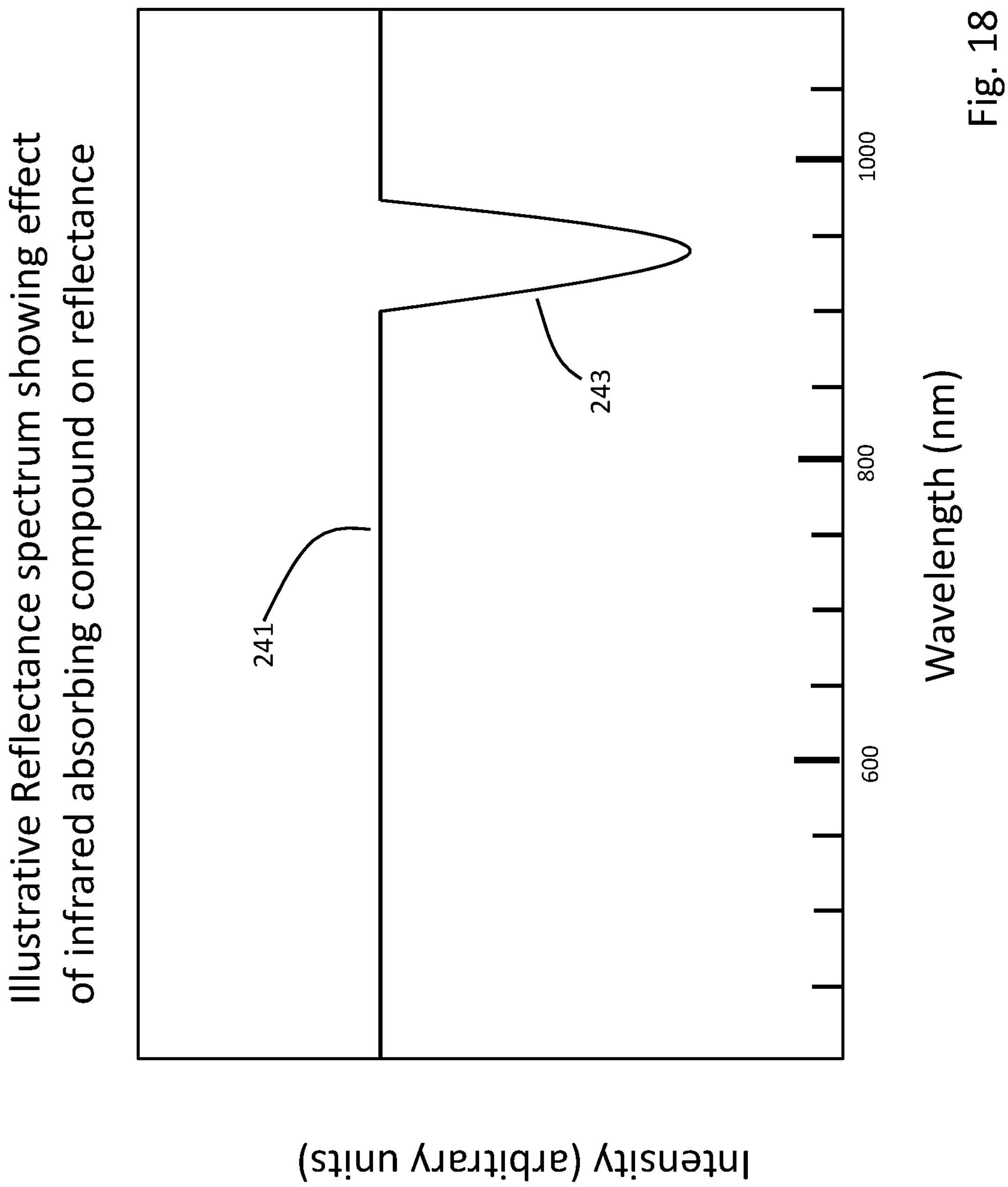
FIG. 18 schematically illustrates how the presence of a taggant compound in the form of an infrared absorber compound reduces the intensity of light reflected from a label in an infrared bandwidth of the spectrum.

This impact of an IR (infrared) absorbing compound upon reflectance intensity is shown FIG. 18. FIG. 18 shows a curve 241 of the intensity of reflected light as a function of wavelength. Curve 241 includes depression 243 in an infrared bandwidth portion. Depression 243 is a result of one or more infrared absorbing compounds absorbing incident illumination in this bandwidth portion to reduce the intensity of the reflected light in the region. In the absence of such a compound, there would be no such attenuation of curve 241. This effect can be incorporated into a portion of a spectral code that is based on the presence of the depression 243 or its absence. For example, a spectral code may only be authentic if one of the signature criteria is that this depression 243 is present in detected spectral data. Or, an alternative code may require that the depression be absent if, for example, one or more other specific signature features are present. An LED light source that emits illumination including IR wavelengths would be suitable for evaluating if an illuminated target emits a corresponding spectral response that encodes the at least a portion of the pre-associated spectral code.

The present invention includes aspects in which combinations of spectral codes and image-based codes (such as bar codes) can be used to mark substrates. A data image such as a bar code generally includes imageable data encoded in a visual pattern readable by machine decoding using suitable decoding algorithms. A data image includes data that is often indicative of one or more characteristics of the substrate that is marked with the data image. Such data may encode a SKU number, source, brand name, type of product, instructions, ingredients or components, and the like. In many embodiments, a data image includes at least one linear (1D) or two-dimensional (2D) bar code image.

Embodiments of bar code images may store the data in the image using any suitable bar code(s). The Universal Product Code (UPC) is one example of a linear bar code. The UPC code often includes a barcode that encodes a 12-digit UPC number. Six of these digits indicate the manufacturer ID number. The next 5 digits represent the product number. The final digit is a check digit that is used to determine if the code is read properly. A linear barcode such as one that uses the UPC code often encodes mainly alphanumeric information.

A 2D barcode includes a visual pattern in one or more two-dimensional arrays. Often, such an array is square or rectangular, but other shapes may be used. Just like a linear barcode, a 2D bar code encodes imageable data in the form of a machine readable, visual pattern. In contrast to a linear bar code, a 2D barcode can encode substantially more data per unit area. In other words, a 2D barcode stores information at a higher storage density than a linear barcode. A typical 2D barcode can encode at least 2000 alphanumeric characters in illustrative instances in an area under 2.5 $cm^2$, or even under 1.5 $cm^2$, or even under 1 $cm^2$. Also, a 2D bar code may encode data redundancies to minimize data loss if a portion of the bar code is damaged. A 2D bar code also may encode error correction for more reliable reading. A 2d bar code also can be read regardless of orientation.

There are several kinds of 2D barcodes. Examples of popular 2D barcodes include QR Code (which includes micro QR Code, iQR Code, SQRC, and FrameQR Code); Aztec code; MaxiCode; PDF417 code, and Semacode. One or more of these and/or other 2D barcodes may be used to form all or a portion of image 274.

In practice, a linear or 2D barcode is read by using an imaging device to capture an image of the barcode. A suitable algorithm is then used to decode the imageable data encoded in the image. In some cases, the decoding functions and the imaging functions may be incorporated in whole or in part into the local reader being used to image the bar code. Alternatively, after image capture of a bar code image, the image information can be transmitted via a suitable communication pathway to a remote server component in order to handle one or more functions such as decoding to interpret the imageable data stored in image.

Embodiments that incorporate both spectral codes and bar codes onto a substrate are advantageous. Bar codes by themselves are vulnerable to unauthorized copying. Unauthorized copies could be used on counterfeit goods intended to mimic proper goods. In contrast, spectral codes in many embodiments can be much harder to counterfeit than bar code images. Consequently, when both a spectral code and a bar code are applied to a substrate, a key benefit is that the spectral code allows an accompanying bar code to be authenticated when the proper spectral code is present. In contrast, the bar code would be improper if spectral code pre-associated with the bar code is not also present.

The improved coding offered by using both spectral codes and bar codes in combination can be used in a wide range of product and service applications. For example, the combination allows automated activities such as preparation or other manufacturing, inventory control, pricing (e.g., grocery checkout) systems, identification, authentication, malware protection, remote data harvesting, or the like. Examples of products and product combinations that may benefit from these strategies include food and beverage preparation systems, glucose test strips and their corresponding glucose monitoring, respiratory medicines stored in sealed packages and corresponding inhaler devices, and the like. Products liability protection also benefit from authentication strategies that allow a company's own products to be easily distinguished from products of others. Any product susceptible to source confusion, counterfeiting, contract manufacturer over runs or grey market importation can benefit from identification and authentication strategies. Marketing strategies also may involve remotely gathering data from products being used so that marketing decisions, customer service, product performance, and the like can be managed or improved.

Figure 19:
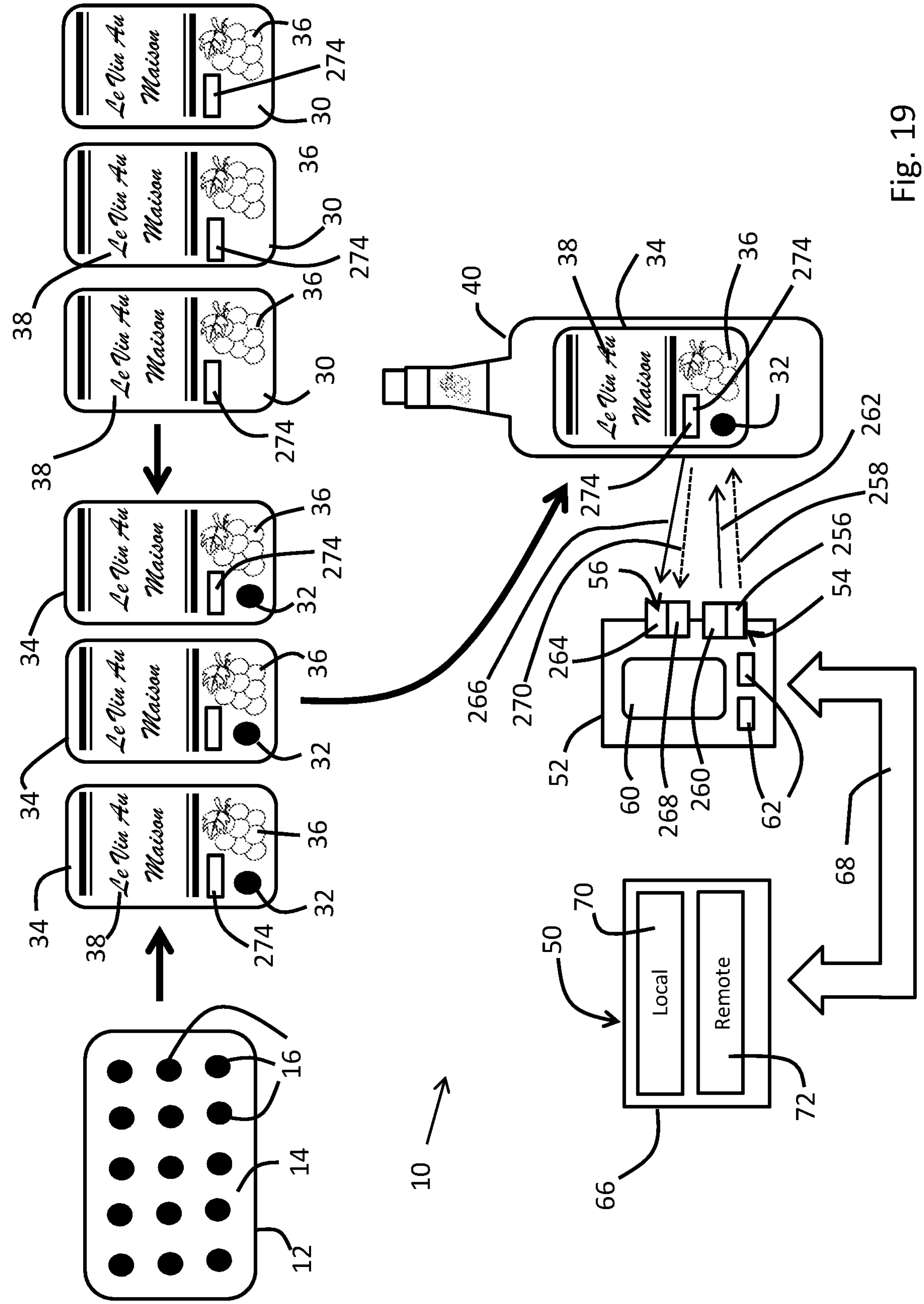
FIG. 19 shows a modification of the system of FIG. 1 to further include bar code information on a label in combination with a spectrally responsive image of the present invention.

FIG. 19 shows on approach by which system 10 of FIG. 1 can be modified to incorporate both spectral signature and bar code strategies. First, labels 30 are modified to include bar code images 274. Consequently, when the heat transfer images 16 are applied onto labels 30 the resultant spectrally responsive label 34 include both the spectrally responsive transferred images 32 as well as the barcode images 274. In this embodiment, it is convenient to include the bar code images 274 as part of the graphic indicia included on the labels 30.

FIG. 19 also shows a further modification of FIG. 1 that allows both the spectral code and the bar code to be read. Detector device 52 is modified so that illumination system 54 includes both illumination sources 256 and 260, and so that the sensor system 56 includes both sensors 264 and 268. In use, illumination source 256 illuminates the transferred image 32 with a suitable illumination 258 effective to trigger a desired spectral response 270 when the proper taggant system 22 is incorporated into the transferred image 32. The spectral response 270 is detected by sensor 268. In one mode of practice a suitable illumination source 256 provides LED illumination with a main spectral peak including 458 nm. In another mode of practice, a suitable illumination source 256 provides LED illumination with a main spectral peak including 385 nm. In other mode of practice, a suitable illumination source 256 provides LED illumination with a main spectral peak including a wavelength in the range from 700 nm to 1200 nm.

Illumination source 260 illuminates bar code 274 with illumination 262 so that imaging sensor 264 can capture the reflected image light 266. In some modes of practice, illumination source 260 need not be a separate illumination source but can be the same as illumination source 256. In those embodiments in which illumination sources 256 and 260 are separate, the two sources 256 and 260 can be actuated sequentially in any order. This allows sensors 264 and 268 to detect responses 266 and 270, respectively, at different times. In those modes in which illumination sources 256 and 260 are the same, sensors 264 and 268 may detect responses 266 and 270 at the same time.

One or both of sensors 264 and 268 may be fitted with optical filter(s) to block some wavelengths from reaching such sensor(s). For example, sensor 268 may be fitted with an optical filter that blocks at least a portion, preferably substantially all, of the illumination wavelengths of illumination 258 from being sensed.

Figure 20:
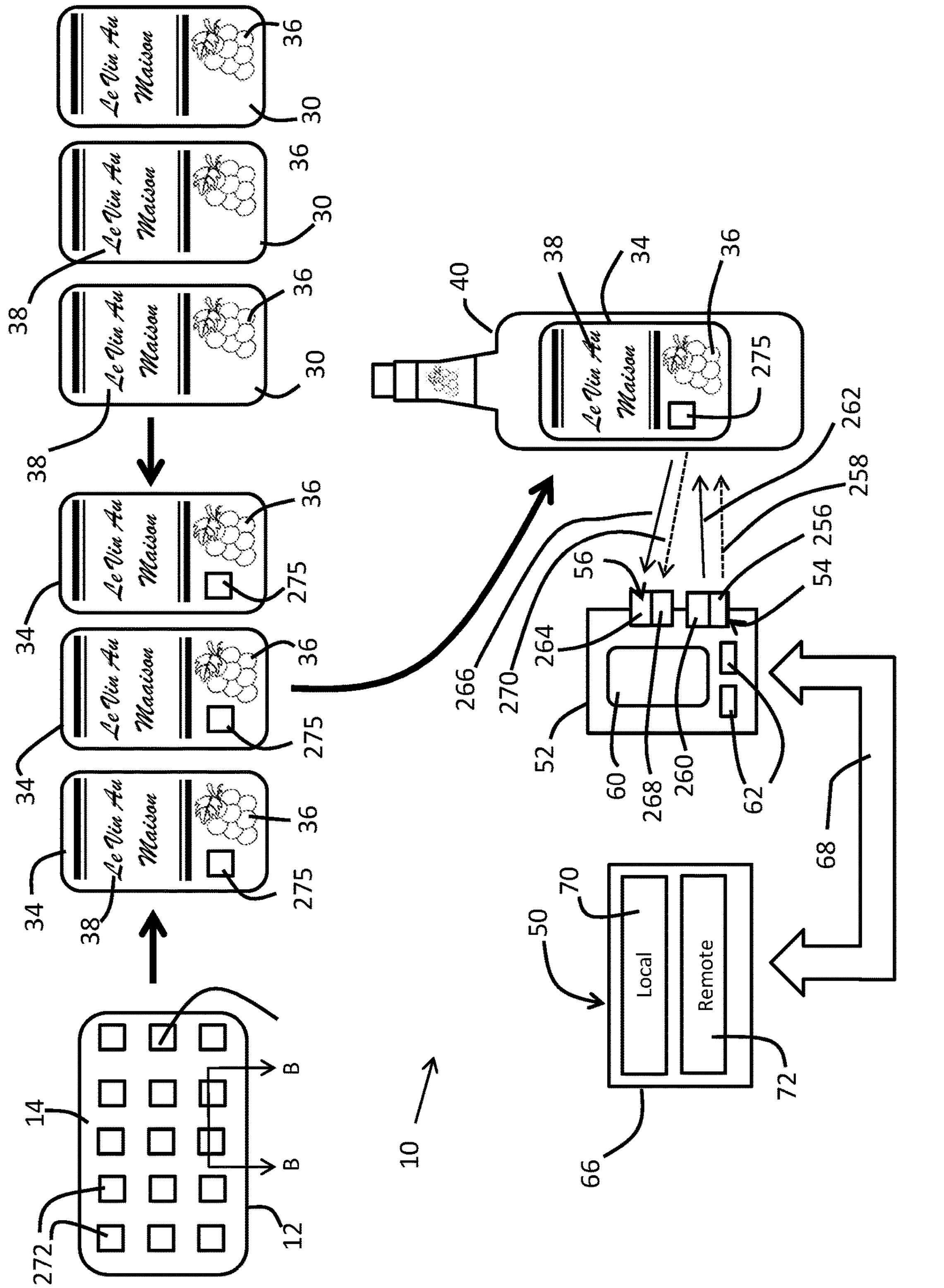
FIG. 20 shows a further modification of the system of FIG. 1, wherein the heat transfer device includes a heat transferrable image including a bar code superposed with respect to a taggant layer, wherein the taggant layer includes a taggant system that encodes a spectral code.

In FIG. 19, the transferred, spectrally responsive image 32 and the bar code 274 are separate images on the spectrally responsive label 34. In some modes of practice, a spectral code and a bar code may be encoded in the same image. Such a mode of modifying system 10 of FIG. 1 to accomplish such a mode of practice is shown in FIG. 20. In such a mode of practice, the bar code and spectral features are incorporated into the same image in a special way that allows each code to be easily read even though the other code also is present.

FIG. 20 is similar to FIG. 19 except that multi-coded heat transferable images 272 incorporating both bar codes and spectral codes are used in heat transfer device 12 instead of heat transfer images 16. Also, labels 30 of FIG. 21 do not include bar codes 274 of FIG. 20. Consequently, the resultant spectrally coded labels 34 and the wine bottle 40 bearing one such label 34 include the transferred images 274 instead of the transferred images 32. As a further difference between FIGS. 19 and 20, detector device 52 in FIG. 20 reads the spectral code and the bar code from the same transferred images 275 rather than separately from transferred image 32 (FIG. 19) and the bar code 274 (FIG. 19).

Figures 21, 22, 23:
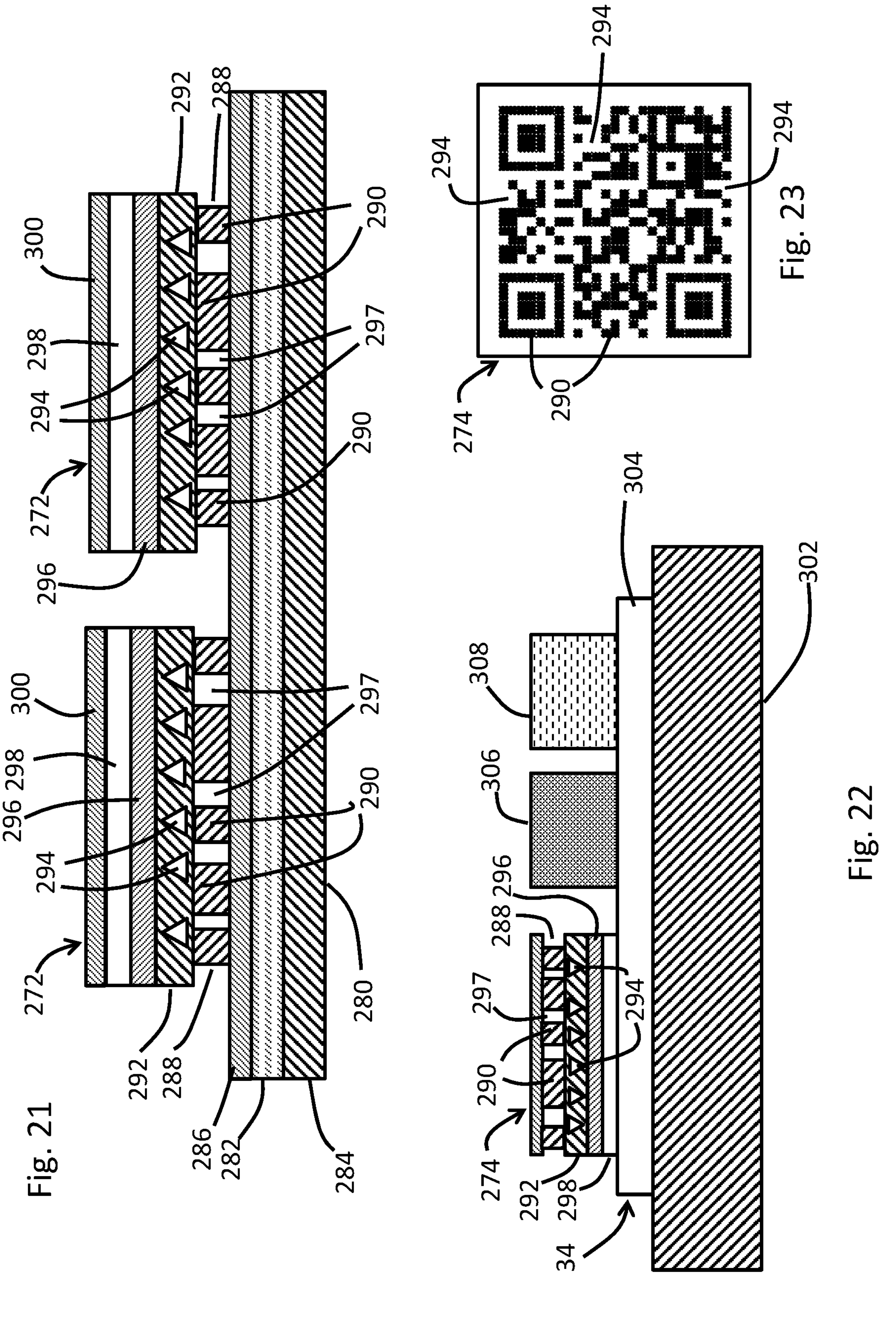
FIG. 21 is a schematic side section view of the transfer device used in the system of FIG. 20 taken through line b-b of FIG. 20.
FIG. 22 is a schematic side section view of a substrate bearing a label that includes the transferred image of FIGS. 20 and 21.
FIG. 23 is a top schematic view of the transferred image incorporated onto the label of FIG. 22.

FIG. 21 shows more details of heat transferrable images 272 releasably supported on carrier 280 prior to being transferred onto labels 30 to provide the spectrally coded labels 34. Similar to heat transfer device shown in FIG. 4*a*, carrier 280 includes a release layer 282 provided on carrier base sheet 284. Each heat transferrable image 272 is provided in upside down fashion on release layer 282 with respect to the final orientation of the images 272 after transfer as transferred images 274.

As was the case with images 16 of FIG. 1, Images 272 of FIG. 21 include optional protective top coat layer 286 provided as a flood coat over the underlying carrier 280. Top coat layer 286 may be similar to topcoat 94 of FIG. 4*a*.

Bar'code image layer 288 is formed on protective top coat layer 286 and includes printed regions 290 that help to encode the bar code. FIG. 22 shows how bar code image layer 288 includes some unprinted regions 297 between the printed regions 290 of the bar code pattern.

In some modes of practice, the bar code image and spectral code may be easily read even though the bar code image overlies the spectral ink layer 292. The reason is that the unprinted regions 297 allow the underlying spectral code to be read through the printed bar code regions 290. Alternatively, in other modes of practice, the printed regions 290 are formed from one or more inks that are reflective or absorbent to visible light illumination in order to contrast to the surrounding unprinted regions 297. However, the printed regions 290 are at least: partially transparent to one or more portions of the IR light spectrum in the range from 700 nm to 1200 nm.

Generally, such inks are visible and appear in solid color to the human eye but are at least partially transparent to infrared (IR) wavelengths. In the printing industry, such inks are known as IR transparent inks, or visibly opaque IR-transmitting inks, IR transmitting inks, IR transmissive inks, or the like. Such inks are available under various product indicia from a wide range of commercial sources including from Standard Colors, Inc. with respect to IRT black products including STANDARD Coat Black 8880 IRT, STANDARD Tint Black 8807 IR, STANDARD TexTint Black 8800 IRT, and PERMACURE Black IRT. Other suppliers include SMAROL, Visualplas, and Adam Gates & Company. Examples of such inks also are described in the patent literature, including China patent CN101688072B, United States patent U.S. Pat. No. 7,407,538B2 and U.S. Pat. No. 7,903,281B2. Particularly preferred IR transmissive inks appear to be opaque black to the human eye, but are highly transparent to IR illumination. Advantageously, this allows the printed bar code regions 290 to be easily imaged when illuminated with visible light. At the same time, the printed regions 290 are suitably transmissive to IR light to allow underlying layers of the transferred images 274 to be illuminated with, and to reflect back, infrared light.

One or more taggant layers are provided on bar code layer 288. For purposes of illustration, a single taggant layer 292 is shown. Taggant layer 292 includes a taggant system including at least one IR absorbing compound 294. The presence of compound 294 provides a reflectance spectrum in which the reflectance spectrum includes intensity depressions in those wavelength regions in which compound 294 absorbs infrared light. FIG. 18 schematically illustrates how the presence of infrared absorbing compound 294 would impact the intensity of a reflectance spectrum.

Advantageously, bar code image layer 288 encodes bar code data in the bar code image pattern, while taggant compound 294 encodes at least a portion of a spectral code.

In use, the complementary features of bar code image layer 288 and taggant layer 292 allow each of the bar code and spectral code to be easily read even though the layers 288 and 292 are superposed. Even though a portion of the underlying taggant layer 292 is viewable through the unprinted regions of layer 288, those regions appear to be a contrasting color under appropriate ultraviolet, violet, or visible light illumination. Consequently, when illuminated with suitable light, the bar code pattern is easily viewable in high contrast to the underlying layer 292 so that the bar code can be imaged and decoded. Then, when layers 288 and 292 are illuminated with infrared light, the IR transmissive characteristics of bar code image layer 288 allow the IR light to be transmitted to the underlying taggant layer 292 and reflected back. This allows the IR response of the taggant layer 292 to be easily read through the bar code image layer 288. Schematically, a practical result of the strategy is that the bar code image layer 288 is opaque when the bar code is being read, but is sufficiently invisible or transparent when the taggant layer is read. In similar fashion; the underlying taggant layer 292 provides high contrast to the bar code image when the bar code is read but is opaque when its spectral code is being read with IR illumination.

Still referring to FIG. 21 base color layer 296 is provided on the taggant layer 292. Metal foil layer 298 is provided on base color layer 296. Metal foil layer 298 incorporates a metal foil and an adhesive layer that helps to adhere metal foil layer 298 to the base color layer 296. Often, a metal foil and such an adhesive layer are available in a commercially available product in which the metal foil and adhesive are supported on a separate carrier sheet. The adhesive layer helps to transfer and adhere the metal foil and adhesive from such other carrier sheet onto the base color layer 296. Another adhesive layer 300 is provided on the metal foil layer 298. The layers 296, 298, and 300 may be formed in the same manner as described above with respect to the corresponding base color layer, adhesive layer, metal foil layer, and hot melt adhesive layer 90, 92, 96, and 97 of FIG. 4*a*.

FIG. 22 schematically shows how label 34 incorporating heat transferred image 274 and other printed indicia 306 and 308 on support 304 is affixed onto a substrate 302. FIG. 23 shows a top view of the heat transferred image 274, wherein the printed regions 290 of bar code image layer 288 are highly contrasted to the underlying taggant layer 292 under visible light illumination.

Figure 24:
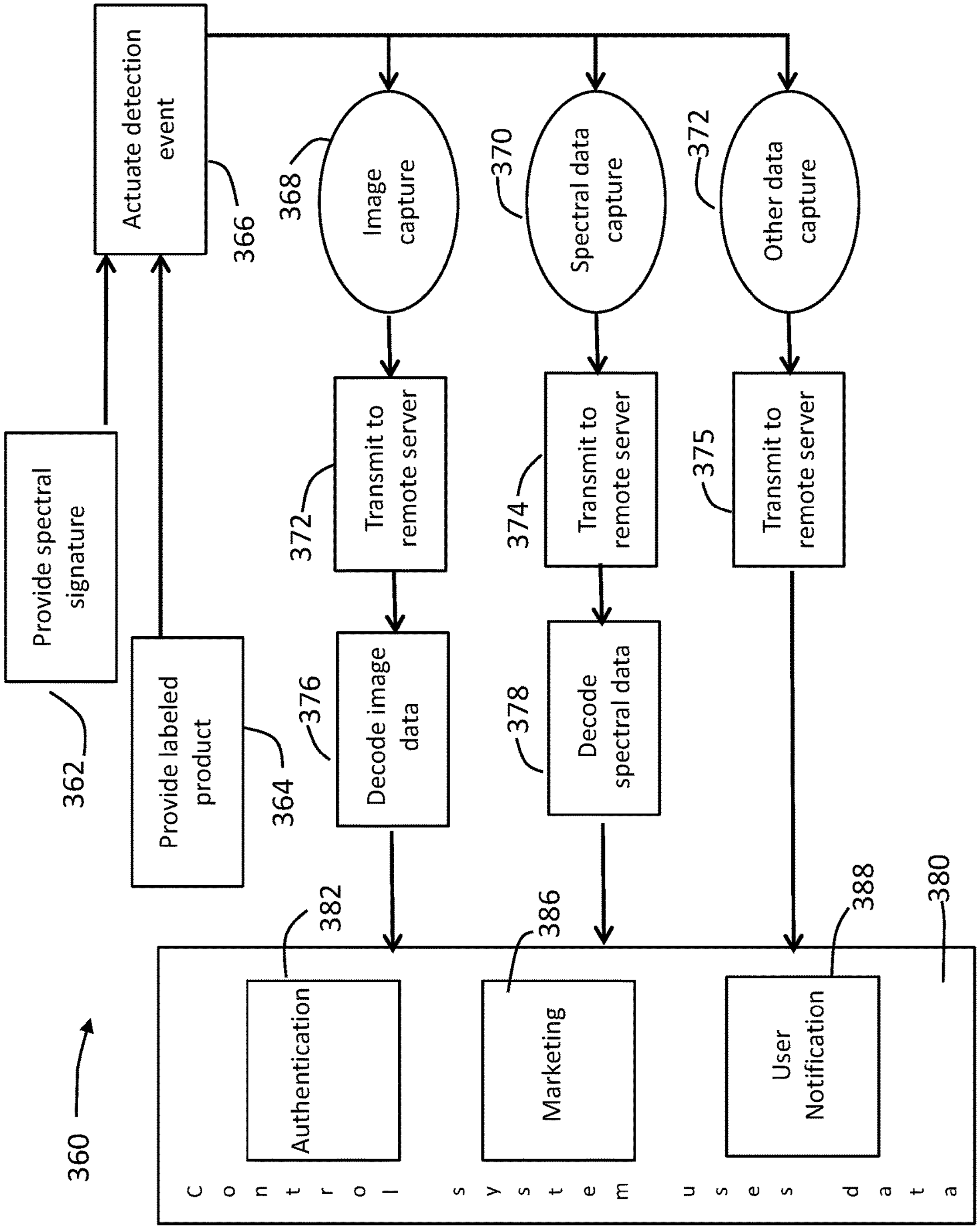
FIG. 24 schematically illustrates a method of using the labeled product of FIG. 20.

As shown in FIG. 24, an illustrative method 360 of practicing the present invention with respect to multi-coded labels is shown. For purposes of illustration, the method 360 is described with respect to a labeled wine bottle. Similar labeling, code reading, data harvesting, identification, authentication, using, and the like can be used with other substrates bearing spectrally and bar code responsive labels including superposed spectral codes and bar codes.

Method 360 is integrated with data harvesting and authentication protocols in accordance with the present invention. In particular, an aspect of method 360 involves using a suitable IR illumination source and a corresponding spectral detector to determine if a labeled wine bottle exhibits a proper spectral response indicative of whether the proper taggant system is present. A different illumination source may be used to illuminate labeled wine bottle 40 so that the bar code features can be captured by suitable image capture and then decoded by the control system 50.

In the illustrated embodiment, method 360 includes step 362 in which a spectral code and a bar code are provided that are pre-associated with an authentic, properly labeled wine bottle such as wine bottle 40 of FIG. 21. A labeled wine bottle is provided in step 362 for evaluation, wherein the wine bottle bears a bar code image. One goal of method 360 is to determine if the bar code image also incorporates the proper spectral code. If the wine bottle being evaluated is authentic, then the proper spectral code will be detected when spectrally reading the labeled wine bottle.

In step 366, a detection event is actuated. Control system 50 will initiate data harvesting functions, authentication functions using spectral code data, and/or other functions in subsequent steps of method 360.

Method step 368 and step 370 involve data harvesting from the wine bottle label. In particular, spectral code features if any and bar code features if any are read. In step 368, an image sensor captures an image of the bar code on the wine bottle label. According to step 368, the bar code may be illuminated with one or more illumination sources 260 (See FIG. 20) to assist image capture. When using system 10 of FIG. 21, control system 50 causes image sensor 264 to capture an image of the bar code on the wine bottle.

In step 370, the bar code image is illuminated with illumination including infrared light. A sensor detects the response, and the response is evaluated to assess if the proper spectral code is incorporated into the response. In the case of system 10 of FIG. 21, control system 50 causes sensor 268 to capture spectral data (if any) in the reflected light 270 emitted by the bar code image when illuminated with one or more infrared illumination sources 258. Control system 50 can use the captured spectral data to determine if the correct spectral code associated with taggant compound 294 is present in the captured spectral data Optional method step 382 harvests other data from the detector being used to harvest the data. Steps 368, 370, and 372 can be performed in any order or at least partially at the same time.

As described, a substantial amount of data can be harvested from the bar code image using imaging and spectral data analysis. In some embodiments, the method further includes step 372. Step 372 involves capturing additional preparation parameters (e.g., date, time, beverage size, user, geographic location, beverage preparation temperature, etc.) available from other components of system 10.

For example, with respect to system 10 of FIG. 21, steps 372, 374, and 375 involve transmitting harvested data to the remote server components 72. Steps 372, 374, and 375 may occur in any order or at least partially at the same time. In step 372, the captured image data is transmitted to the remote server components 72 and stored in a memory there. In step 374, the captured spectral data is transmitted to the remote server components 72 and stored in a memory there. Optionally, the resultant image data and spectral data may be stored in a memory onboard the control system 50 in local components 70 in addition to or as an alternative to storage in the remote memory. The additional data captured in step 382 also may be transmitted to the remote server components 72. Control system 50 may cause the captured beverage preparation parameters to be stored in a centralized marketing database along with data harvested from the wine label.

Step 376 involves decoding the image data. For example, decoding may involve decoding one or more bar codes and/or translating images of text information using OCR techniques. The decoded image data can provide a wide variety of information about the nature of the wine product such as SKU number, brand name, year, production lot, wine type, ingredients, serving instructions, storing instructions, and the like. Decoding may occur in local control system components 70 located onboard the detector device 52. Alternatively, decoding may occur in remote control system components such as via a processor incorporated into remote server component 72.

Step 378 involves decoding the spectral data derived from the bar code image. Decoding may involve evaluating the spectral data to determine if the proper spectral code provided by taggant compound 294 is present. Decoding may occur in control system components 70 located onboard the detector device 52. Alternatively, decoding may occur in remote control system components 72.

Control system 50 may use the decoded image data, spectral data, and/or other data in a variety of different ways in step 380. Exemplary uses include one or more of authentication in step 382, marketing analysis in step 386, and/or user notifications in step 388.

For example, as one option, the decoded spectral and/or image information can be used for authentication in step 382 to confirm that the wine bottle is supplied by an authentic source and is not counterfeit. Authentication may involve determining if the spectral code information resulting from infrared illumination includes spectral code features associated with the proper presence of taggant compound 294. If the proper signature response of taggant compound 294 is detected, control system 50 can produce an authentication output to confirm that the bottle is authenticated as associated with a particular source.

An authentication output may authenticate a wine bottle as coming from a particular source only when the spectral data and the decoded image data match an authorized association of the two data types. For example, a particular spectral code may be authentic only when appearing on a bottle whose image data encodes a particular brand and type of contents. If the brand and type of contents match the signature according to such a pre-determined association, the bottle may be deemed to be authentic relative to a particular source.

Alternatively, if the image data and the signature data do not match according to pre-determined authorized associations of the two data types, a bottle would not be authenticated as coming from one of the pre-associated authentic sources. The lack of association, for example, could indicate that the bottle was a generic brand or is counterfeit. Control system 50 can produce an authentication output to indicate that the spectral data does not include a proper spectral code associated with one or more authentic commercial sources in the event that the proper signature associated with compound 294 is not detected. Control system 50 can store the authentication output in a centralized marketing database that collects authentication outputs from a plurality of systems 10 used by a plurality of users.

The data also can be used to support marketing efforts in step 386. For this purpose, the data can be accessed by one or more entities sources in order to learn information about consumer behavior that can assist in the analysis, planning and implementation of marketing and business plans for the development, manufacture, sale, and/or distribution of the wines.

According to one aspect of marketing analysis, the control system 50 is configured to track the number of bottles of wines consumed by users (e.g., the number of bottles used and/or the types of wine used). In some embodiments, the remote server components 72 may track consumption by tracking the number of times a machine sends data to the remote server components 72. That is, the remote server components 72 may tally the number of bottles that were imaged by the apparatus. In another embodiment, the remote server components 72 may track consumption by tallying the information extracted from the decoded indicia. That is, the remote server components 72 may count the number of each type of bottle is used by the user. Artificial intelligence programming can be used to help undertake a marketing analysis from data harvested from a plurality of users.

According to another embodiment, the remote server components 72 are configured to determine a user's need for replenishment based on the user's consumption and on past purchase history. In some embodiments, the remote server components 72 determine when a user is in need of replenishment by determining when the user's current supply of wine falls below a threshold amount. In some embodiments, the remote server components 72 determine the user's current wine supply (e.g., a remaining number of unused bottles) by comparing the number of wine bottles purchased by the consumer (e.g., purchased from the beverage forming apparatus manufacturer, such as via an e-commerce website) and the number of bottles consumed by the user. The remote server components 72 also may determine whether the number of remaining bottles has fallen below the threshold amount. The remote server components 72 may run an algorithm to make such a calculation.

As an additional aspect of using the data in step 380, a further sub-step involves, the sending user notifications in step 388 based upon the decoded or other harvested information (e.g., that there is a sale on a particular type of wine). In some embodiments the user notifications include an email sent to a user's email address (e.g., with a link to purchase the sale items). The user notifications also may include a message displayed on the user interface of the apparatus.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A spectrally responsive transfer system, comprising:

a) a taggant system comprising one or more taggants, said one or more taggants exhibiting spectral characteristics in response to at least one illumination;

b) a spectral code associated with the spectral characteristics of the taggant system;

c) at least one transfer device releasably supported on a carrier, each transfer device comprising a spectrally responsive transferable body releasably supported in an upside down orientation on the carrier in a manner to allow the transferable body to be transferred from the carrier to a substrate in order to form spectrally coded indicia on the substrate, wherein the transferable body comprises:

1) at least one spectral ink layer that is releasably coupled to the carrier, wherein the at least one spectral ink layer incorporates the taggant system;

2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the substrate; and 3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate, and 4) at least one base color layer provided between the at least one spectral ink layer and the at least one metal foil layer such that the at least one base color layer overlies the at least one metal foil layer after the spectrally coded transfer film is transferred from the carrier to a substrate.

2. The spectrally responsive transfer system of claim 1, wherein the metal foil is opaque.

3. The spectrally responsive transfer system of claim 1, wherein the metal foil is vapor deposited, opaque and has a thickness in the range from 0.5 microns to 20 microns.

4. The spectrally responsive transfer system of claim 1, wherein the at least one transfer device is not self-supporting.

5. The spectrally responsive transfer system of claim 1, wherein the at least one transfer device is heat transferrable.

6. The spectrally responsive transfer system of claim 1, wherein the at least one transfer device is pressure transferrable.

7. The spectrally responsive transfer system of claim 1, wherein the spectrally responsive transfer system comprises a plurality of the heat transfer devices and wherein the carrier supports an array of the heat transfer devices.

8. The spectrally responsive transfer system of claim 1, wherein the taggant system comprises a first taggant compound and a second taggant compound.

9. The spectrally responsive transfer system of claim 8, wherein the first and second taggant compounds are fluorescent compounds that interact according to fluorescence resonance energy transfer.

10. The spectrally responsive transfer system of claim 1, wherein the taggant system comprises a luminescent taggant compound and an IR absorbing compound.

11. The spectrally responsive transfer system of claim 1, wherein the taggant system comprises and optical brightener compound.

12. The spectrally responsive transfer system of claim 1, wherein at least one transfer device further comprises a bar code, wherein the spectral code is associated with the bar code.

13. The spectrally responsive transfer system of claim 12, wherein the at least one spectral ink layer provides a spectral image, and wherein the bar code and the spectral image are separate images in a transferrable body.

14. The spectrally responsive transfer system of claim 12, wherein the at least one spectral ink layer provides a spectral image, and wherein the bar code and the spectral image are encoded in the same image.

15. The spectrally responsive transfer system of claim 12, wherein the at least one spectral ink layer provides a spectral image, and wherein the bar code overlies the spectral image.

16. The spectrally responsive transfer system of claim 15, wherein the bar code image is imagable when illuminated with visible light and at least partially transparent to one or more portions of the IR light spectrum in a range from 700 nm to 1200 nm.

17. The spectrally responsive transfer system of claim 1, wherein the taggant system comprises first and second taggant compounds, wherein the first taggant compound is incorporated into a first taggant layer of the transferrable body and the second taggant compound is incorporated into a second taggant layer of the transferrable body.

18. The spectrally responsive transfer system of claim 1, wherein the metal foil layer is formed in selected regions of a transfer device.

19. The spectrally responsive transfer system of claim 1, wherein the metal foil layer is continuous in a transfer device.

20. A spectrally responsive transfer system, comprising:

a) a taggant system comprising one or more taggants, said one or more taggants exhibiting spectral characteristics in response to at least one illumination;

b) a spectral code associated with the spectral characteristics of the taggant system;

c) at least one transfer device releasably supported on a carrier, each transfer device comprising a spectrally responsive transferable body releasably supported in an upside down orientation on the carrier in a manner to allow the transferable body to be transferred from the carrier to a substrate, wherein the transferable body comprises:

1) at least one spectral ink layer that is releasably coupled to the carrier, wherein the at least one spectral ink layer incorporates the taggant system;

2) at least one base color layer provided over the at least one spectral ink layer such that the at least one base color layer overlies the at least one spectral ink layer when the transferable body is releasably supported on the carrier and such that the at least one base color underlies the at least one spectral ink layer when the transferable body is transferred from the carrier onto the substrate;

3) at least one metal foil layer provided over the at least one base color layer such that the metal foil layer overlies the at least one base color layer when the transferable body is releasably supported on the carrier and such that the metal foil layer underlies the at least one base color layer when the transferable body is transferred from the carrier onto the substrate; and 4) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate.

21. The spectrally responsive transfer system of claim 20, wherein the base color layer is formed so that underlying regions of the metal foil layer are viewable through the base color layer when a transferrable body is transferred onto a substrate.

22. The spectrally responsive transfer system of claim 20, wherein the base color layer is formed so that the base color layer is discontinuous in a transferrable body.

23. A spectral signature system, comprising:

a) a taggant system comprising one or more taggants, said one or more taggants exhibiting spectral characteristics in response to at least one illumination;

b) a spectral code associated with the spectral characteristics of the taggant system;

c) at least one transfer device releasably supported on a carrier, each transfer device comprising a transferable body releasably supported in an upside down orientation on the carrier in a manner to allow the transferable body to be transferred to a substrate, wherein the transferable body comprises:

1) at least one spectral ink layer that is releasably coupled to the carrier, wherein the at least one spectral ink layer incorporates the taggant system;

2) at least one base color layer provided on the at least one spectral ink layer such that the at least one base color layer overlies the 3) at least one spectral ink layer when the transferable body is releasably supported on the carrier and such that the at least one base color underlies the at least one spectral ink layer when the transferable body is transferred from the carrier onto the substrate;

4) at least one metal foil layer provided over the at least one base color layer such that the metal foil layer overlies the at least one base color layer when the transferable body is releasably supported on the carrier and such that the metal foil layer underlies the at least one base color layer when the transferable body is transferred from the carrier onto the substrate; and 5) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the substrate;

d) an illumination system that emits at least one illumination in a manner such that when the transferable body is transferred from the carrier onto a substrate to become a transferred body and is illuminated by an illumination, the transferred body emits a spectral response that encodes the spectral code;

e) at least one detector that detects the spectral response; and f) a control system comprising program instructions that evaluate information comprising the spectral response to determine information indicative of whether the spectral code is detected.

24. A method of making a spectrally coded substrate, comprising the steps of:

a) providing at least one transfer device releasably supported on a carrier, each transfer device comprising a transferable body releasably supported in an upside down orientation on the carrier in a manner to allow the transferable body to be transferred to a substrate, wherein the transferable body comprises:

1) at least one spectral ink layer that is releasably coupled to the carrier, wherein the at least one spectral ink layer incorporates the taggant system, said taggant system comprising one or more taggants;

2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the additional label; and 3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the additional label, and 4) at least one base color layer provided between the at least one spectral ink layer and the at least one metal foil layer such that the at least one base color layer overlies the at least one metal foil layer after the spectrally coded transfer film is transferred from the carrier to a substrate; and b) transferring a transferable body associated with the substrate from the carrier onto the substrate to thereby provide the spectrally coded substrate.

25. The method of claim 24, wherein the substrate is a label.

26. The method of claim 24, wherein the substrate is a product.

27. The method of claim 24, wherein the substrate is product packaging.

28. The method of claim 24, wherein the substrate is an identification card.

29. A method of making a spectrally coded label, comprising the steps of:

a) providing at least one transfer device releasably supported on a carrier, each transfer device comprising a transferable body releasably supported in an upside down orientation on a carrier in a manner to allow the transferable body to be transferred to the label, wherein the transferable body comprises:

1) at least one spectral ink layer that is releasably coupled to the carrier, wherein the at least one spectral ink layer incorporates the taggant system, said taggant system comprising one or more taggants;

2) at least one metal foil layer provided over the at least one spectral ink layer such that the metal foil layer overlies the at least one spectral ink layer when the transferable body is releasably supported on the carrier and such that the metal foil layer underlies the at least one spectral ink layer when the transferable body is transferred from the carrier onto the label; and 3) an adhesive layer provided over the metal foil layer such that the adhesive layer overlies the metal foil layer when the transferable body is releasably supported on the carrier and such that the adhesive layer underlies the metal foil layer and couples the metal foil layer to the substrate when the transferable body is transferred from the carrier to the label, and 4) at least one base color layer provided between the at least one spectral ink layer and the at least one metal foil layer such that the at least one base color layer overlies the at least one metal foil layer after the spectrally coded transfer film is transferred from the carrier to a substrate; and b) transferring a transferable body associated with the label from the carrier onto the label to thereby provide the spectrally coded label.

* * * * *